United States Patent
Hong et al.

(10) Patent No.: US 10,257,865 B2
(45) Date of Patent: Apr. 9, 2019

(54) APPARATUS AND METHOD FOR INSTALLING ELECTRONIC DEVICE IN WIRELESS COMMUNICATION SYSTEM

(71) Applicant: SAMSUNG ELECTRONICS CO., LTD., Suwon-si, Gyeonggi-do (KR)

(72) Inventors: Jinyoung Hong, Yongin-si (KR); Sung-Hoon Kim, Seoul (KR); Hyukjoong Kwon, Suwon-si (KR); Junhyung Kim, Yongin-si (KR); Seungeok Choi, Suwon-si (KR); Jaiick Chun, Seongnam-si (KR)

(73) Assignee: Samsung Electronics, Co., Ltd., Suwon-si, Gyeonggi-do (KR)

( * ) Notice: Subject to any disclaimer, the term of this patent is extended or adjusted under 35 U.S.C. 154(b) by 87 days.

(21) Appl. No.: 15/404,654

(22) Filed: Jan. 12, 2017

(65) Prior Publication Data

US 2017/0202037 A1 Jul. 13, 2017

(30) Foreign Application Priority Data

Jan. 12, 2016 (KR) .................. 10-2016-0003751

(51) Int. Cl.
*H04W 76/10* (2018.01)
*H04W 4/02* (2018.01)
(Continued)

(52) U.S. Cl.
CPC .............. *H04W 76/10* (2018.02); *H04W 4/02* (2013.01); *H04W 8/005* (2013.01); *H04W 12/06* (2013.01);
(Continued)

(58) Field of Classification Search
CPC ....... H04W 8/005; H04W 4/02; H04W 84/18; H04W 88/16; H04W 4/70; H04W 4/005;
(Continued)

(56) References Cited

U.S. PATENT DOCUMENTS

2009/0059842 A1 3/2009 Maltseff et al.
2013/0324844 A1 12/2013 Knowland et al.
(Continued)

FOREIGN PATENT DOCUMENTS

KR 10-2015-0008800 1/2015

OTHER PUBLICATIONS

Search Report and Written Opinion dated Apr. 18, 2017 in counterpart International Patent Application No. PCT/KR2017/000403.
(Continued)

*Primary Examiner* — Jae Y Lee
*Assistant Examiner* — Aixa A Guadalupe Cruz
(74) *Attorney, Agent, or Firm* — Nixon & Vanderhye P.C.

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. The present disclosure provides an apparatus and a method for installing an electronic device in a wireless communication system. A method for operating a first electronic device includes obtaining location information of the first electronic device, and sending the location information of the first electronic device to a system controller to operate a second electronic device to be paired with a third electronic device located near the first electronic device, in a pairing mode.

20 Claims, 19 Drawing Sheets

(51) Int. Cl.
*H04W 8/00* (2009.01)
*H04W 60/00* (2009.01)
*H04W 12/06* (2009.01)
*H04L 29/06* (2006.01)
*H04W 12/04* (2009.01)
*H04W 84/18* (2009.01)

(52) U.S. Cl.
CPC ........... *H04W 60/00* (2013.01); *H04L 63/083* (2013.01); *H04L 63/0876* (2013.01); *H04W 12/04* (2013.01); *H04W 84/18* (2013.01)

(58) Field of Classification Search
CPC ............... H04W 76/14; H04L 41/0806; H04L 41/0813; H04M 1/7253
See application file for complete search history.

(56) References Cited

U.S. PATENT DOCUMENTS

| | | |
|---|---|---|
| 2014/0280983 A1 | 9/2014 | Paluch et al. |
| 2014/0340243 A1 | 11/2014 | Becker et al. |
| 2014/0359272 A1 | 12/2014 | Hiltunen et al. |
| 2015/0180842 A1* | 6/2015 | Panther .............. H04L 63/0464 713/153 |
| 2015/0373747 A1 | 12/2015 | Nevarez Pedroza |
| 2016/0100310 A1* | 4/2016 | Lee ..................... H04W 4/70 713/171 |
| 2017/0164193 A1* | 6/2017 | Bicket .................. H04W 12/06 |

OTHER PUBLICATIONS

Extended European Search Report for EP Application No. 17738648.9 dated Oct. 31, 2018.

* cited by examiner

APPARATUS AND METHOD FOR INSTALLING ELECTRONIC DEVICE IN WIRELESS COMMUNICATION SYSTEM

CROSS-REFERENCE TO RELATED APPLICATION

The present application is based on and claims priority under 35 U.S.C. § 119 to a Korean patent application filed in the Korean Intellectual Property Office on Jan. 12, 2016, and assigned Serial No. 10-2016-0003751, the disclosure of which is incorporated by reference herein in its entirety.

TECHNICAL FIELD

The present disclosure relates generally to an apparatus and a method for installing a device in a wireless communication system.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

For example, a communication method which interconnects a plurality of sensors and gateways installed in a particular area or building is drawing attention. For the communications between the sensors and the gateways, they require pairing between them. Typically, a gateway supporting Wireless Fidelity (WiFi) can detect and pair with a sensor device without separately switching to a pairing mode. However, a gateway supporting Zigbee, Bluetooth, or Z-wave needs to enter the pairing mode to achieve the pairing. For example, the gateway supporting Zigbee can operate in the pairing mode for a certain time when a user presses a key button or a menu button to switch to the pairing mode, and scans and pairs with a sensor device. Herein, when a certain time passes after the pairing mode switch button is pressed, the gateway supporting Zigbee switches from the pairing mode back to a normal mode. For example, FIG. 1 depicts a conventional pairing method of a plurality of sensors and gateways supporting Zigbee, Bluetooth, or Z-wave. As illustrated in FIG. 1, when the gateways 100-1 through 100-N and the sensors 101-1 through 101-N are deployed, the gateways 100-1 through 100-N operate in the normal mode which does not support the pairing until a user input occurs and accordingly cannot not detect a sensor device to pair with. Hence, after installing the sensor 101-2, the user needs to press in person the pairing mode switch buttons of the gateways 100-1 and the sensor 101-2 in order to pair the sensor 101-2 with the gateway 100-1 as illustrated in FIG. 1. Upon detecting the pairing mode switch button pressed by the user, the sensor 101-2 and the gateway 100-1 can enter the pairing mode, scan each other, and thus fulfill the pairing. However, the user has to personally select the pairing buttons of the sensors 101-1 through 101-N and the pairing button of the corresponding gateway 100-1 through 100-N in every installation of the sensors 100-1 through 100-N. In addition, when the gateways 100-1 through 100-N are installed inaccessibly (e.g., at a ceiling of a building), the user has great difficulty in selecting the pairing button for the installation of the sensors 101-1 through 101-N due to the location of the gateways 100-1 through 100-N. In the conventional method, with the plurality of the gateways 100-1 through 100-N, it is difficult for the user to determine which gateway should be paired with each of the sensors 101-1 through 101-N for the sake of efficiency. Further, since the user personally selects the sensor and the gateway in the conventional method, the user can determine an incorrect or suboptimal gateway to pair with the sensor among the plurality of the gateways. In this case, security can be compromised.

SUMMARY

To address the above-discussed deficiencies, an example aspect of the present disclosure provides an apparatus and a method for selecting a gateway to pair with a device based on location information of a terminal in device installation in a wireless communication system.

Another example aspect of the present disclosure provides an apparatus and a method for enhancing security by pairing a device and a gateway based on device identification information obtained by a terminal in a wireless communication system.

Yet another example aspect of the present disclosure provides an apparatus and a method for controlling a device based on device additional information obtained by a terminal in a gateway of a wireless communication system.

Still another example aspect of the present disclosure provides an apparatus and a method for simplifying device registration based on terminal location information in a wireless communication system.

According to an example aspect of the present disclosure, a method for operating a first electronic device includes obtaining location information of the first electronic device, and sending the location information of the first electronic device to a system controller to operate a second electronic device to be paired with a third electronic device located near the first electronic device, in a pairing mode.

According to another example aspect of the present disclosure, a method for operating a system controller includes receiving location information of a first electronic device from the first electronic device, determining a second electronic device to be paired with a third electronic device located near the first electronic device based on the location information of the first electronic device, and sending a signal requesting operation in a pairing mode, to the determined second electronic device.

According to yet another example aspect of the present disclosure, a method for operating a second electronic device includes receiving a signal requesting operation in a pairing mode from a system controller, entering the pairing mode in response to the received signal requesting operation in the pairing mode, and pairing with at least one third electronic device.

According to still another example aspect of the present disclosure, a method for operating a first electronic device includes sending location information of the first electronic device to a system controller, receiving a first signal comprising identification information of a second electronic device corresponding to the location information from the system controller, and sending a second signal comprising the identification information to the second electronic device.

According to a further example aspect of the present disclosure, a method for operating a system controller includes receiving location information from a first electronic device, sending a signal comprising identification information of a second electronic device corresponding to the received location information among a plurality of second electronic devices, to the first electronic device, and receiving a signal indicating that registration of the identification information is completed, from the second electronic device.

According to a further example aspect of the present disclosure, a method for operating a second electronic device includes receiving a signal comprising identification information from a first electronic device, registering the identification information as identification information of the second electronic device, and sending a signal indicating that the identification information registration is completed, to a system controller.

According to a further example aspect of the present disclosure, a first electronic device includes a communication unit comprising communication circuitry and a processor, wherein the processor is configured to obtain location information of the first electronic device, and to send the location information of the first electronic device to a system controller to operate a second electronic device to be paired with a third electronic device located near the first electronic device, in a pairing mode.

According to a further example aspect of the present disclosure, a system controller includes a communication unit comprising communication circuitry and a processor, wherein the processor is configured to receive location information of a first electronic device from the first electronic device, to determine a second electronic device to be paired with a third electronic device located near the first electronic device based on the location information of the first electronic device, and to send a signal requesting operation in a pairing mode to the determined second electronic device.

According to a further example aspect of the present disclosure, a second electronic device includes a communication unit comprising communication circuitry and a processor, wherein the processor is configured to receive a signal requesting operation in a pairing mode from a system controller, to enter the pairing mode in response to the received signal requesting operation in the pairing mode, and to pair with at least one third electronic device.

According to a further example aspect of the present disclosure, a first electronic device includes a communication unit comprising communication circuitry and a processor, wherein the processor is configured to send location information of the first electronic device to a system controller, to receive a first signal comprising identification information of a second electronic device corresponding to the location information from the system controller, and to send a second signal comprising the identification information to the second electronic device.

According to a further example aspect of the present disclosure, a system controller includes a communication unit comprising communication circuitry and a processor, wherein the processor is configured to receive location information from a first electronic device, to send a signal comprising identification information of a second electronic device corresponding to the received location information among a plurality of second electronic devices, to the first electronic device, and to receive a signal indicating that registration of the identification information is completed, from the second electronic device.

According to a further example aspect of the present disclosure, a second electronic device includes a communication unit comprising communication circuitry and a processor, wherein the processor is configured to receive a signal comprising identification information from a first electronic device, to register the identification information as identification information of the second electronic device, and to send a signal indicating that the identification information registration is completed, to a system controller.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and attendant advantages of the present disclosure will be more apparent and readily understood from the following detailed description, taken in conjunction with the accompanying drawings, in which like reference numerals refer to like elements, and wherein.

Throughout the drawings, like reference numerals will be understood to refer to like parts, components and structures.

DETAILED DESCRIPTION

The following description is made with reference to the accompanying drawings and is provided to assist in a comprehensive understanding of example embodiments of the disclosure as defined by the claims and their equivalents. The disclosure includes various details to assist in that understanding but these are to be regarded as merely examples. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of example embodiments of the present disclosure is provided for illustration purpose only and not for the purpose of limiting the disclosure as defined by the appended claims and their equivalents.

Example embodiments of the present disclosure provide a technique for simplifying a process for device communication in device installation in a wireless communication system.

Hereinafter, terms indicating control information, terms indicating status changes (e.g., event), terms indicating network entities, terms indicating messages or signals, and terms indicating device components are explained for the understanding. Accordingly, the present disclosure is not limited to those terms and can employ other terms having technically equivalent meanings.

According to various example embodiments, a terminal can be a portable electronic device, and the portable electronic device can include, for example, and without limitation, one of a smart phone, a portable terminal, a mobile phone, a mobile pad, a media player, a tablet computer, a handheld computer, and a Personal Digital Assistant (PDA), or the like. The terminal can combine two or more functions of those devices.

A sensor device can include, for example, and without limitation, at least one sensor and may require pairing with another electronic device. For example, the sensor device can be an electronic device including a temperature sensor, a humidity sensor, a body motion sensor, a light sensor, or the like. The sensor device may be referred to as a sensor. Hereinafter, the present disclosure is not limited to such sensor devices and can employ various electronic devices allowing the pairing. An air conditioning device may refer, for example, to an electronic device which maintains the temperature and the humidity at proper levels, and does not require the pairing with another electronic device. For example, the air conditioning device can include a heating device, a cooling device, a heat exchanger, and so on.

Figure 1:
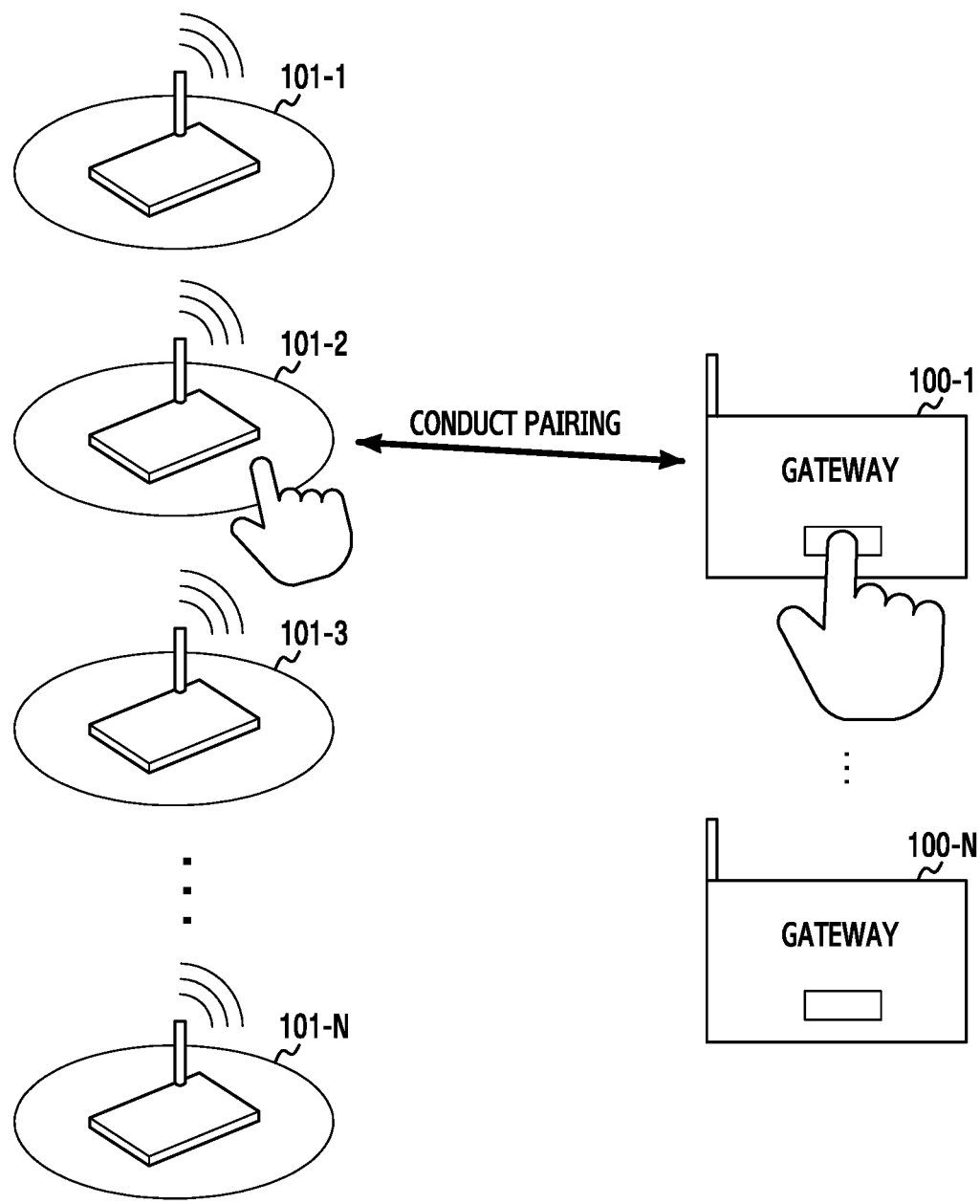
FIG. 1 is a diagram illustrating an example conventional pairing method of a plurality of sensors and gateways supporting Zigbee, Bluetooth, or Z-wave.
Figure 2:
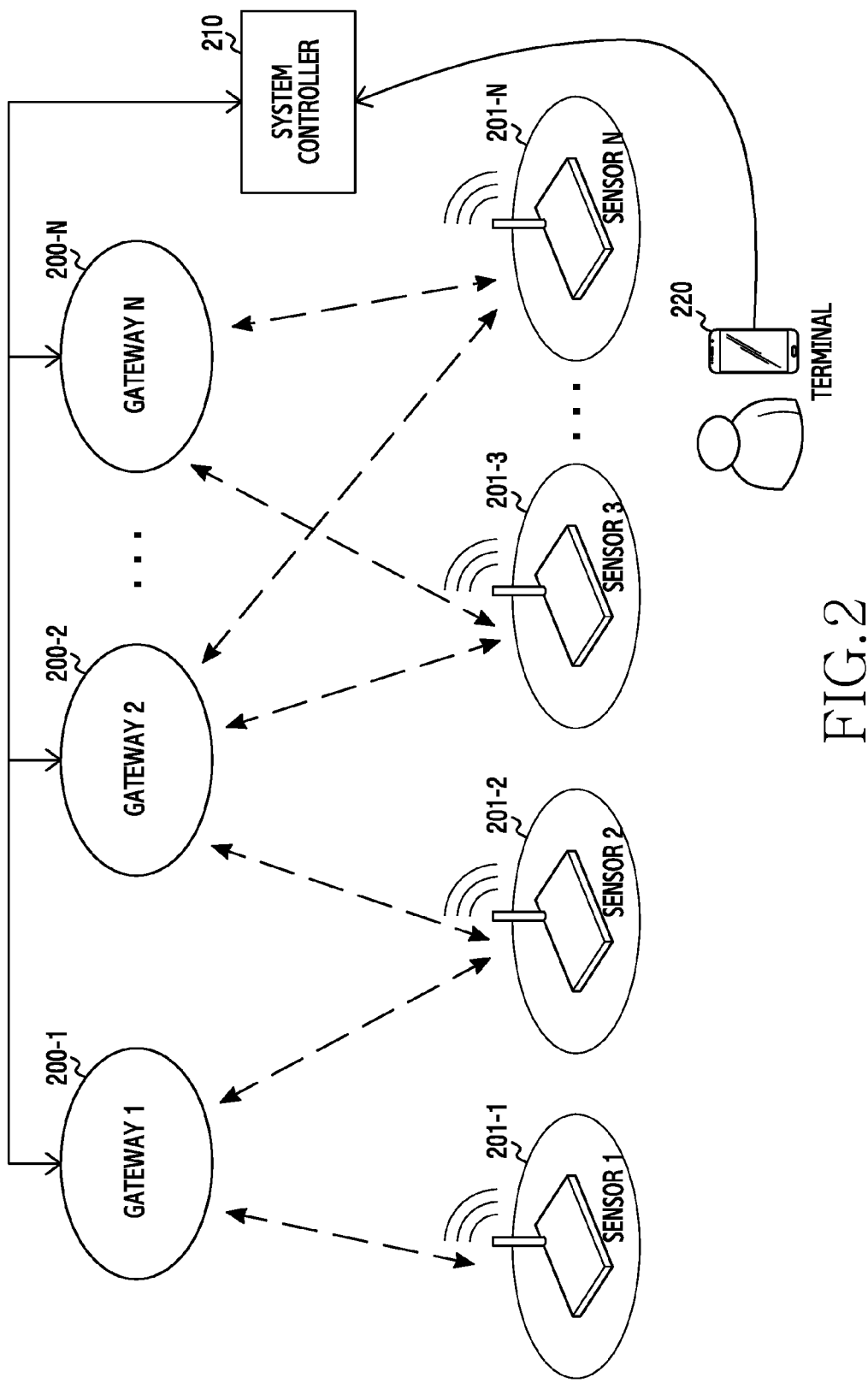
FIG. 2 is a diagram illustrating an example wireless communication system according to an example embodiment of the present disclosure.

FIG. 2 is a diagram illustrating an example wireless communication system according to an example embodiment of the present disclosure.

Referring to FIG. 2, the wireless communication system can include a plurality of gateways 200-1 through 200-N, a plurality of sensor devices 201-1 through 201-N, a system controller 210, and a terminal 220.

The gateway 200 can pair with at least one sensor device 201 and thus can communicate with the at least one paired sensor device 201. Herein, the gateway 200 can be one of the gateways 200-1 through 200-N. The sensor device 201 can be one of the sensor devices 201-1 through 201-N.

Figure 9:
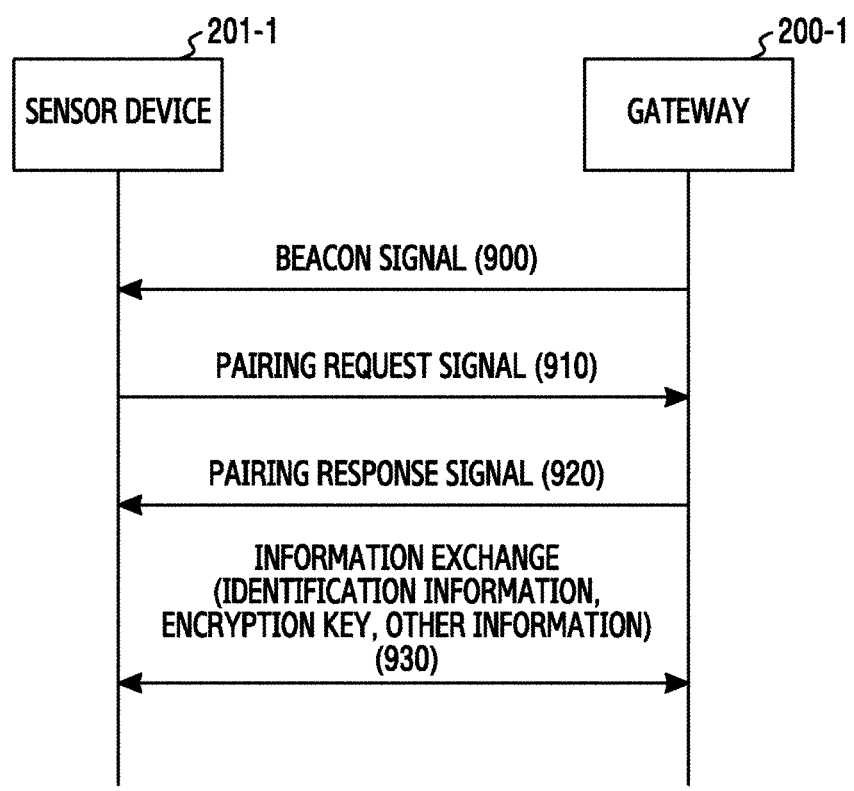
FIG. 9 is a signal flow diagram illustrating example pairing of a gateway and a sensor device in a wireless communication system according to an example embodiment of the present disclosure.

The gateway 200 may be referred to, for example, as an Access Point (AP), a sensor AP, an integrated AP, a sensor controller, or a communication device. The gateway 200 can enter a pairing mode under control of the system controller 210 and thus pair with one sensor device 201. For example, the gateway 200 can perform the pairing as illustrated in FIG. 9. Herein, the pairing mode can send or receive a pairing request signal for the pairing. The gateway 200 can receive sensor identification information from the system controller 210 and pair with the sensor device 201 corresponding to the received sensor identification information. The gateway 200 can receive additional information about the sensor device 201 from the system controller 210 in the pairing procedure, and control at least one sensor device 201 paired based on the additional information. For example, the first gateway 200-1 can obtain information indicating that height information of the first sensor device 201-1 is 0 m and height information of the second sensor device 201-2 is 2 m, and generate control information for the first sensor device 201-1 and the second sensor device 201-2 based on a height difference of the first sensor device 201-1 and the second sensor device 201-2. Herein, the height information can include altitude information indicating an installation location of the corresponding sensor device based on a reference location. The gateway 200 can send the sensor device identification information obtained in the pairing procedure, to the system controller 210. For example, after pairing with the first sensor device 201-1, the first gateway 200-1 can send an Identifier (ID) allocated to the sensor device 201 in the pairing procedure, to the system controller 210.

The sensor device 201 can pair with at least one gateway 200 and thus communicate with the at least one gateway 200 paired. The sensor device 201 can enter the pairing mode by hands of the user. Herein, the user can include a manager or an installer of the sensor device 201. For example, when detecting an event of the user for the pairing mode entry, the sensor device 201 can enter the pairing mode. Herein, the event for the pairing mode entry can include pressing a physical button or selecting a software menu item, or the like, but is not limited thereto. According to an example embodiment, the sensor device 201 can transmit the identification information. For example, the sensor device 201 can transmit the identification information to the terminal 220 using a short-range wireless communication technique (e.g., Near Field Communication (NFC)). In the pairing procedure with the gateway 200, the sensor device 201 can obtain its identification information from the gateway 200 and register the obtained identification information. For example, the sensor device 201 can perform the pairing as illustrated in FIG. 9. The sensor device 201 can operate based on a control signal of the paired gateway.

The system controller 210 can communicate with at least one of the gateway 200, the sensor device 201, and the terminal 220. The system controller 210 may be referred to as an AP controller, a gateway controller, or a server. According to an example embodiment, the system controller 210 can receive location information from the terminal 220 and determine one of the gateways 200-1 through 200-N based on the received location information. The system controller 210 can send a signal requesting the pairing mode entry to the determined gateway. The system controller 210 can obtain information about at least one of the sensor devices 201-1 through 201-N from the terminal 220, and transmit the obtained information to the determined gateway. The information about the sensor device 201 can include, for example, the identification information and the additional information (e.g., height information) of the sensor device. The system controller 210 can receive identification information of the sensor device paired with the gateway 200, from the gateway 200. The system controller 210 can pre-store location information of the sensor devices, and determine a sensor device closest to the location information received from the terminal 220 based on the pre-stored location information of the sensor devices. The system controller 210 can allocate the identification information received from the gateway 200, to the sensor device closest to the location information received from the terminal 220. Herein, the system controller 210 can pre-store an electronic drawing including installation locations or deployment information of the sensor devices 201-1 through 201-N.

Although not illustrated in the drawing, according to another example embodiment, the system controller 210 can retrieve identification information of an air conditioning device (not shown) based on the location information of the terminal 220, and transmit the retrieved identification information of the air conditioning device to the terminal 220. The system controller 210 can receive a signal indicating that the identification information of the air conditioning device is registered to the corresponding air conditioning device, from the air conditioning device. The system controller 210 can send a signal indicating that the identification information of the air conditioning device is registered, to the terminal 220.

The terminal 220 may transmit various information for the pairing of the sensor device 210 and the gateway 200, to the system controller 210 under user control. For example, when entering a sensor device management mode under user control, the terminal 220 may periodically obtain the location information of the terminal 220 and transmit the obtained information to the system controller 210. The terminal 220 can obtain the identification information of the sensor device 201 to pair with the gateway, and transmit the obtained identification information of the sensor device 201 to the system controller 210. Herein, the identification information of the sensor device 201 can be acquired from an image captured by a camera of the terminal 220 or using the short-range wireless communication, etc. The terminal 220 may obtain additional information of the sensor device 201 to pair with the gateway 200 and transmit the obtained additional information to the system controller 210. For example, the terminal 220 can obtain the height information of the sensor device 201 through a barometer or altimeter, or the like, and transmit the obtained height information to the system controller 210.

According to another example embodiment, the terminal 220 can transmit its location information to the system controller 210 and obtain identification information of the air conditioning device (not shown) from the system controller 210 in response to the location information of the terminal 220. The terminal 220 can transmit the obtained identification information of the air conditioning device to the air conditioning device. In so doing, the terminal 220 can transmit the identification information of the air conditioning device to the air conditioning device at a particular location using, for example, beamforming communication or Infrared (IR) ray communication. The terminal 220 can receive the information indicating that the identification information is registered, from the system controller 210 or the air conditioning device. After sending the identification information, the terminal 220 can repeatedly transmit the identification information of the air conditioning device to the air conditioning device until the information indicating that the identification information is registered is received. Upon receiving the information indicating that the identification information is registered, the terminal 220 can display a graphical effect, display a message, output a sound signal, or produce vibration in order to notify the user that the identification information of the air conditioning device is registered.

Figure 3:
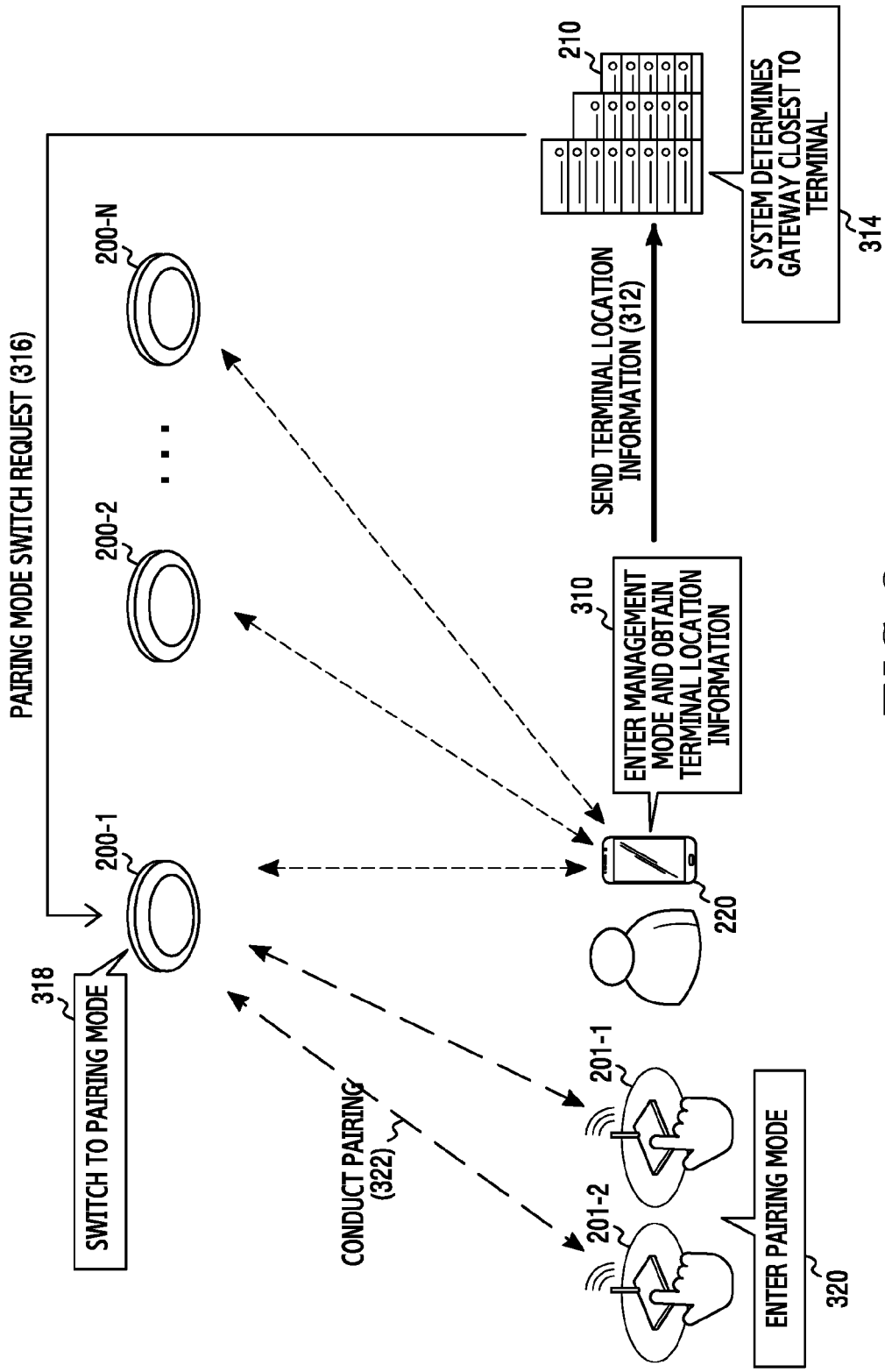
FIG. 3 is a diagram illustrating example pairing mode entry of sensor devices and gateways in a wireless communication system according to an example embodiment of the present disclosure.

FIG. 3 is a diagram illustrating example pairing mode entry of a sensor device and a gateway in a wireless communication system according to an example embodiment of the present disclosure. Herein, it is assumed that the user installs the first sensor device 201-1 and the second sensor device 201-2. Hereafter, operations are not always conducted in sequence. For example, the order of the operations may be changed, or at least two operations may be conducted in parallel.

Referring to FIG. 3, in operation 310, the terminal 220 operates in the management mode according to a user input and periodically obtains its location information while in the management mode. Herein, the management mode can control the state of at least one of the installed sensor device and gateway. For example, the management mode can switch the sensor device to a state for communicating with other device (the gateway or the system controller). When a management mode entry icon (or menu item) is selected on a screen or a particular key button for the management mode entry is pressed, the terminal 220 can enter the management mode. Also, the terminal 220 can periodically obtain its location information using a location information receiving device therein.

In operation 312, the terminal 220 can transmit its location information to the system controller 210. Herein, the terminal 220 can periodically transmit its location information to the system controller 210 in the management mode.

In operation 314, the system controller 210 determines a gateway closest to the terminal 220 based on the location information received from the terminal 220. For example, the system controller 210 compares the pre-stored location information of the gateways 200-1 through 200-N with the location information of the terminal 220 and thus determine the gateway closest to the terminal 220 among the gateways 200-1 through 200-N. Herein, to ease the understanding, it is assumed that the first gateway 200-1 is the closest to the terminal 220. In operation 316, the system controller 210 requests the first gateway 200-1 which is the closest to the terminal 220, to switch to the pairing mode. For example, the system controller 210 can request the first gateway 200-1 to enter the pairing mode so as to pair with at least one sensor device. Additionally, the system controller 210 can determine whether the location information received from the terminal 220 is changed, and skip operations 314 and 316 when the location information is not changed. For example, when the location information previously received from the terminal 220 is the same as location information currently received from the terminal 220, the system controller 210 can skip operations 314 and 316.

In operation 318, the first gateway 200-1 switches to the pairing mode based on the request of the system controller 210. The first gateway 200-1 in the pairing mode can send a pairing request signal or determine whether a pairing request signal is received. In operation 320, the first sensor device 201-1 and the second sensor device 201-2 enter the pairing mode under the user control. For example, upon detecting the input of the pairing mode entry key button, the first sensor device 201-1 and the second sensor device 201-2 each can enter the pairing mode and send a pairing request signal or determine whether a pairing request signal is received. In operation 322, the first sensor device 201-1 and the second sensor device 201-2 each can pair with the first gateway 200-1. Herein, the pairing can be conducted as illustrated in FIG. 9.

As illustrated in FIG. 3, since the system controller 210 determines the gateway based on the location information of the terminal 220, the user does not have to select the gateway in person and thus can avoid selecting an incorrect gateway. In addition, since the system controller 210 requests the pairing mode switch from the gateway corresponding to the location information of the terminal 220, the user does not need to personally access a gateway of low accessibility to select the pairing mode button.

Figure 4:
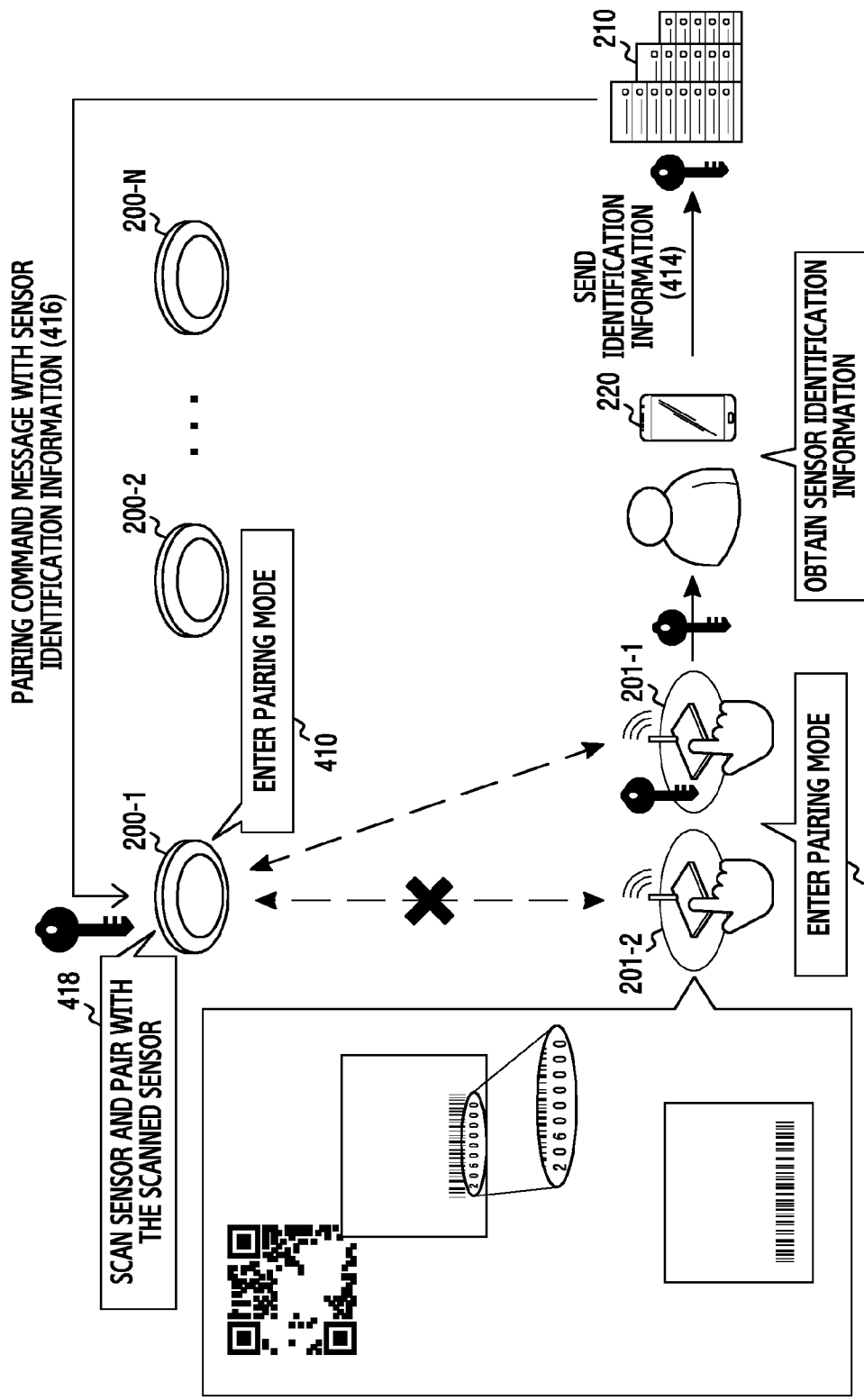
FIG. 4 is a diagram illustrating example pairing of sensor devices and gateways in a wireless communication system according to an example embodiment of the present disclosure.

Hereafter, a security problem in operation 322 of FIG. 3 is removed in FIG. 4. For example, when the first gateway 200-1 enters the pairing mode in operation 320 of FIG. 3 and other device than the first sensor device 201-1 and the second sensor device 201-2 enters the pairing mode, the first gateway 200-1 can pair with the other device in a manner contrary to the user's intention. When the first gateway 200-1 enters the pairing mode, the pairing with the unintended device is prevented and/or avoided as illustrated in FIG. 4.

FIG. 4 is a diagram illustrating example pairing of sensor devices and gateways in a wireless communication system according to an example embodiment of the present disclosure.

Referring to FIG. 4, in operation 410, the first sensor device 201-1, the second sensor device 201-2, and the first gateway 200-1 enter and operate in the pairing mode. For example, the first sensor device 201-1, the second sensor device 201-2, and the first gateway 200-1 can enter the pairing mode as illustrated in FIG. 3. For example, the first sensor device 201-1, the second sensor device 201-2, and the first gateway 200-1 each can detect the input of the pairing mode entry key button and enter the pairing mode.

In operation 412, the terminal 220 obtains sensor identification information under user control. Herein, the terminal 220 can operate in the management mode. For example, the terminal 220 can drive a camera under the user control and obtain the identification information of the first sensor device 201-1 from an image captured by the camera. For example, the terminal 220 can drive a short-range wireless communication module which supports the short-range wireless communication (e.g., NFC, Radio Frequency IDentification (RFID)) and obtain the identification information of the first sensor device 201-1 through the short-range wireless communication module. Herein, the identification information of the sensor device can include unique identification information of the sensor device, such as a Personal Identification Number (PIN), a Medium Access Control (MAC) address, a Quick Response (QR) code, and a serial number, or the like, but is not limited thereto.

In operation 414, the terminal 220 transmits the obtained sensor identification information to the system controller 210. The terminal 220 can transmit the sensor identification information together with its current location information.

In operation 416, the system controller 210 sends a pairing command message including the sensor identification information to the first gateway 200-1. When receiving the sensor identification information together with the terminal location information from the terminal 220, the system controller 210 can determine a gateway to which the sensor identification information is transmitted, based on the location information of the terminal 220. On the other hand, when receiving the sensor identification information alone from the terminal 220, the system controller 210 can a gateway to which the sensor identification information is transmitted, based on terminal location information previously obtained from the corresponding terminal 220.

In operation 418, the first gateway 200-1 scans the first sensor device 201-1 corresponding to the received sensor identification information and pairs with the first sensor device 201-1. Herein, since the first gateway 200-1 performs the pairing based on the received sensor identification information, it can pair with the first sensor device 201-1. For example, the first gateway 200-1 can pair with the first sensor device 201-1 as illustrated in FIG. 9. On the other hand, the first gateway 200-1 does not pair with the second sensor device 201-2. For example, the first gateway 200-1, which receives the identification information of the first sensor device 201-1 from the system controller 210, determines that the first sensor device 201-1 is authorized by the user and pairs with the first sensor device 201-1. On the other hand, the first gateway 200-1, which does not receive the identification information of the second sensor device 201-2 from the system controller 210, determines that the second sensor device 201-2 is not authorized by the user and does not pair with the second sensor device 201-2.

In FIG. 4, after the first sensor device 201-1, the second sensor device 201-2, and the first gateway 200-1 enter the pairing mode, the terminal 220 obtains the identification information of the first sensor device 201-1 and transmits the obtained identification information to the first gateway 200-1 via the system controller 210. However, according to an example embodiment, before the first sensor device 201-1, the second sensor device 201-2, and the first gateway 200-1 enter the pairing mode, the terminal 220 can obtain the identification information of the first sensor device 201-1 and transmit the obtained identification information to the first gateway 200-1 via the system controller 210. For example, before the first sensor device 201-1, the second sensor device 201-2, and the first gateway 200-1 enter the pairing mode, the terminal 220 can transmit its location information and identification information to the system controller 210. In this case, the system controller 210 can request the first gateway 200-1 to switch to the pairing mode and transmit the identification information of the first sensor device 201-1.

As above, the terminal 220 obtains the identification information of the first sensor device 201-1 to pair with the first gateway 200-1 and transmits the obtained identification information to the first gateway 200-1 via the system controller 210. Thus, the first gateway 200-1 can avoid pairing with other device and the security can be enhanced.

Figure 5A:
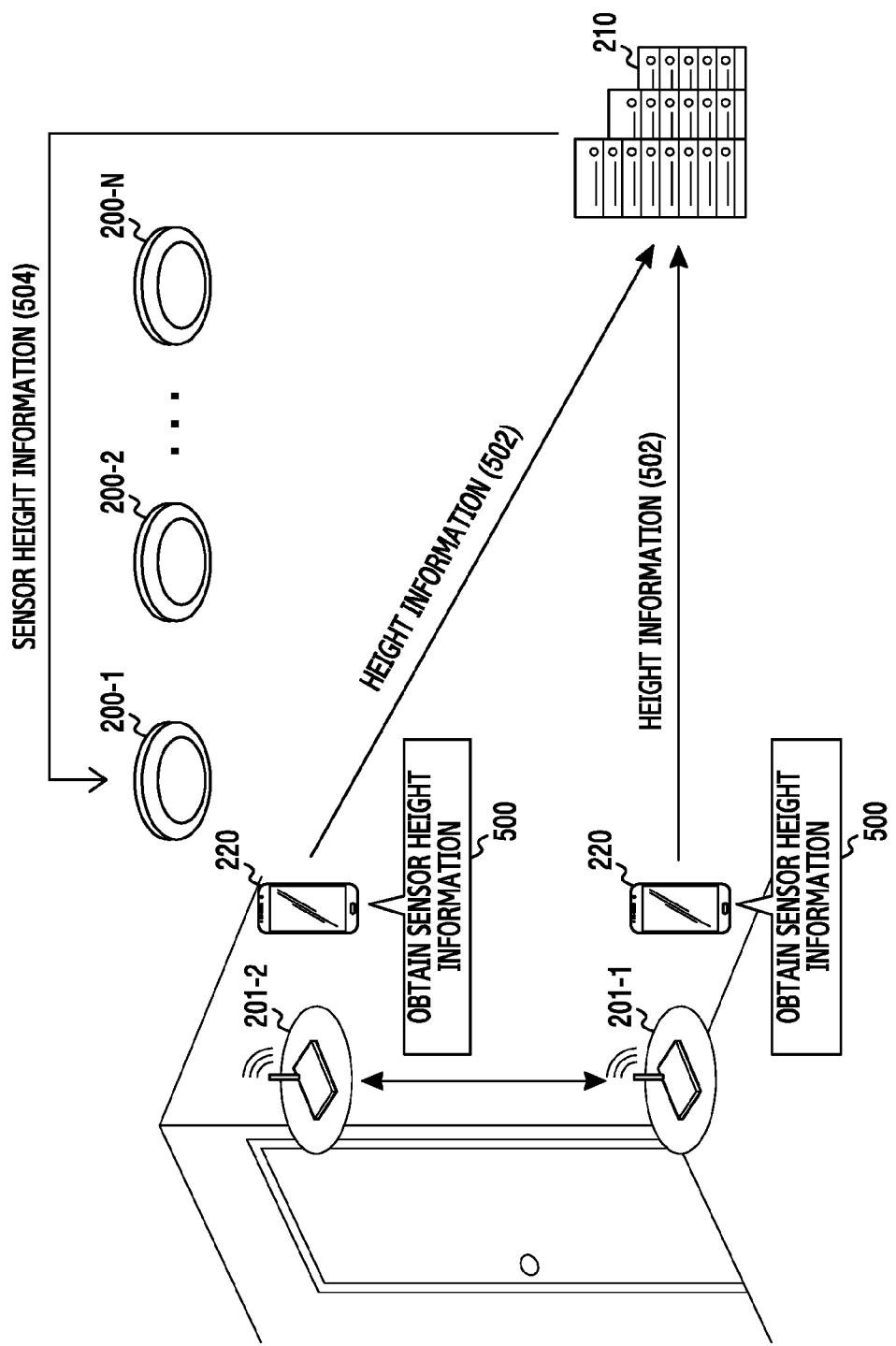
FIG. 5A is a diagram illustrating example sensor device information obtained by a gateway in a wireless communication system according to an example embodiment of the present disclosure.

In FIG. 5A, additional information about the sensor device is obtained in the pairing procedure of FIG. 3 and FIG. 4.

FIG. 5A is a diagram illustrating example sensor device information obtained by a gateway in a wireless communication system according to an example embodiment of the present disclosure.

Referring to FIG. 5A, in operation 500, the terminal 220 can obtain height information of the first sensor device 201-1 and the second sensor device 201-2. For example, the terminal 220 can obtain atmospheric pressure information from its barometer at the location of the first sensor device 201-1, and obtain the height information of the first sensor device 201-1 based on the obtained atmospheric pressure information. The terminal 220 can obtain atmospheric pressure information from its barometer at the location of the second sensor device 201-2, and obtain the height information of the second sensor device 201-1 based on the obtained atmospheric pressure information. Herein, when obtaining the height information of the first sensor device 201-1 and the second sensor device 201-2, the terminal 220 should be located at substantially the same altitude as the corresponding sensor device.

In operation 502, the terminal 220 transmits the height information of the first sensor device 201-1 and the second sensor device 201-2 to the system controller 210. The height information of the first sensor device 201-1 and the second sensor device 201-2 can be transmitted together with the terminal location information in operation 312 of FIG. 3, or together with the sensor identification information in operation 414 of FIG. 4. The height information of the first sensor device 201-1 and the second sensor device 201-2 may be transmitted after the first sensor device 201-1 and the second sensor device 201-2 each pair with the first gateway 200-1.

In operation 504, the system controller 210 transmits the sensor height information received from the terminal 220, to the first gateway 200-1. The height information of the first sensor device 201-1 and the second sensor device 201-2 can be carried by the pairing mode change request signal in operation 316 of FIG. 3 or by the pairing command message in operation 416 of FIG. 4. The height information of the first sensor device 201-1 and the second sensor device 201-2 may be transmitted after the first sensor device 201-1 and the second sensor device 201-2 each complete the pairing with the first gateway 200-1.

The gateway 200-1 can receive the height information of the first sensor device 201-1 and the second sensor device 201-2. After pairing with the first sensor device 201-1 and the second sensor device 201-2, the gateway 200-1 can create control information for controlling the first sensor device 201-1 and the second sensor device 201-2 based on the height information of the first sensor device 201-1 and the second sensor device 201-2. For example, the gateway 200-1 can generate control signals including different control information for the first sensor device 201-1 and the second sensor device 201-2 based on the height information of the first sensor device 201-1 and the second sensor device 201-2. More specifically, when the first sensor device 201-1 and the second sensor device 201-2 are sensor devices for controlling the temperature and are located in the same area with different height information, the gateway 200-1 can send a command signal to make an ambient temperature 25 degrees to the first sensor device 201-1 and send a command signal to make an ambient temperature 23 degrees to the second sensor device 201-2.

The system controller 210 can present the locations of the first sensor device 201-1 and the second sensor device 201-2 on a three-dimensional (3D) drawing based on the location information acquired from the terminal 220 and the height information of the first sensor device 201-1 and the second sensor device 201-2.

While the terminal 220 obtains the height information of the first sensor device 201-1 and the second sensor device 201-2 and transmits the obtained height information by way of example, the present disclosure is not limited to the height information. For example, the present disclosure can be equally applied to the additional information obtained in relation to the first sensor device 201-1 and the second sensor device 201-2 through a component (e.g., a communication module, a sensor, etc.) of the terminal 220.

Additionally, the gateway 200 in FIG. 3 through FIG. 5B can send a message indicating pairing mode entry complete and/or pairing complete to the system controller 210. The system controller 210 can forward the received message indicating the pairing mode entry complete and/or the pairing complete to the terminal 220. In response to this, the terminal 220 can display information indicating the pairing mode entry complete of the gateway 200 corresponding to the sensor device 201 or information indicating the pairing complete of the sensor device 201 and the gateway 200 on the screen. In so doing, the terminal 220 can obtain identification information of the gateway 200 corresponding to the sensor device 201 from the message received from the system controller 210, and display information indicating which one of the gateways 200-1 through 200-N enters the pairing mode. Also, the terminal 220 can display information indicating whether the pairing of the sensor device 201 and the gateway 200 is completed based on the message received from the system controller 210.

Figure 5B:
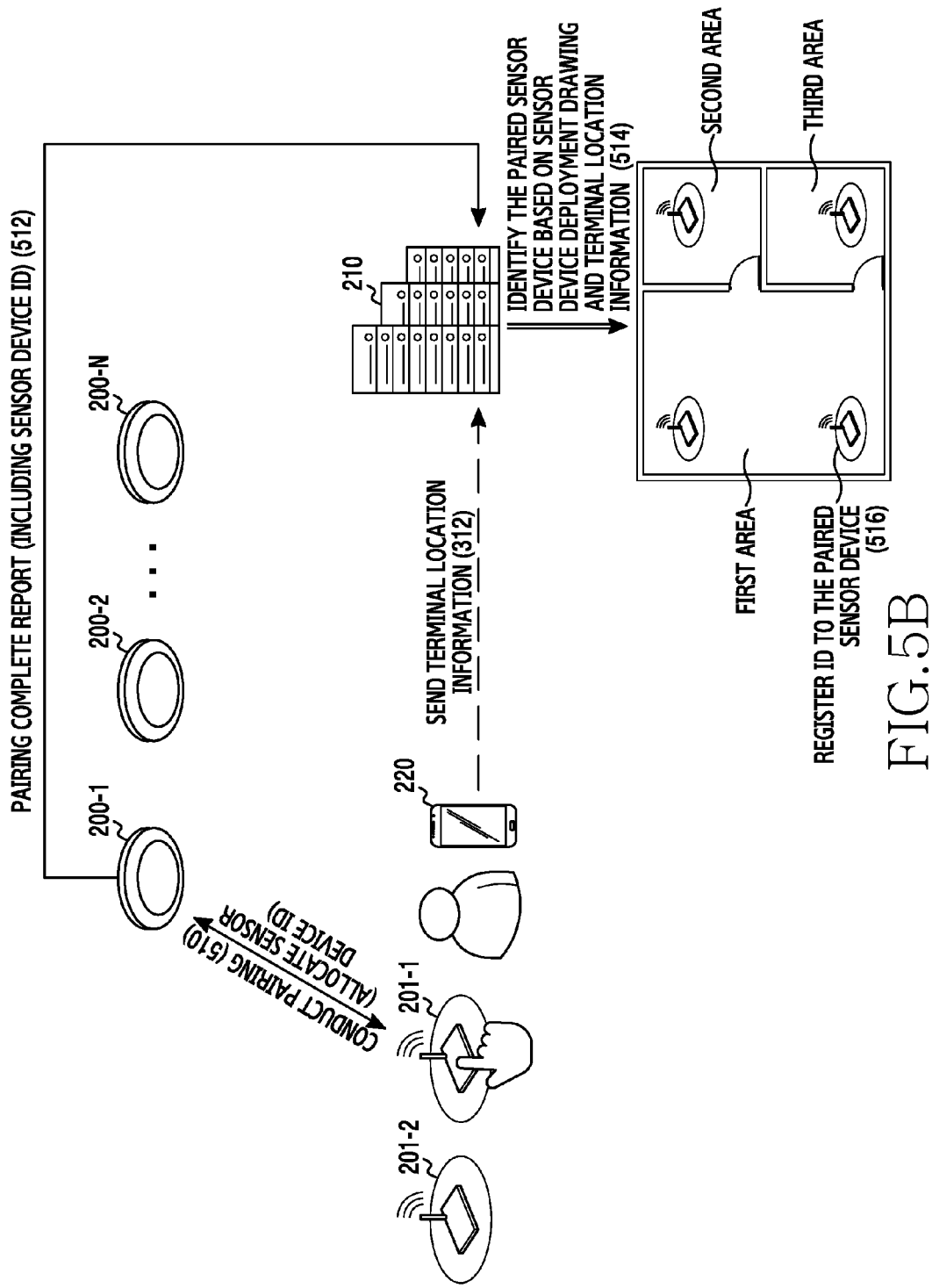
FIG. 5B is a diagram illustrating example sensor device registration in a wireless communication system according to an example embodiment of the present disclosure.

FIG. 5B is a diagram illustrating example sensor device registration in a wireless communication system according to an example embodiment of the present disclosure. Herein, for convenience of explanation, it is assumed that the first sensor device 201-1 pairs with the first gateway 200-1. Operations are not always conducted in sequence. For example, the order of the operations may be changed, and at least two operations may be conducted in parallel.

Referring to FIG. 5B, in operation 510, the first sensor device 201-1 and the first gateway 200-1 execute the pairing as illustrated in FIGS. 3, 4, and 5A. In particular, in the pairing, the first gateway 200-1 can allocate a sensor device ID to the first sensor device 201-1. The first sensor device 201-1 can receive the sensor device ID from the first gateway 200-1 and register the received sensor device ID as its ID.

In operation 512, the first gateway 200-1 sends a message reporting the pairing complete with the first sensor device 201-1, to the system controller 210. The pairing complete report message can include the ID information of the sensor device which pairs with the first gateway 200-1.

In operation 514, the system controller 210 identifies the paired sensor device based on the sensor device deployment drawing and the location information of the terminal 220. In operation 516, the system controller 210 registers the sensor device ID received from the first gateway 200-1 as the ID of the identified sensor device. Herein, the location information of the terminal 220 can indicate the location information transmitted from the terminal 220 to the system controller 210 for the pairing mode entry of the sensor device and the gateway in operation 312 of FIG. 3. The sensor device deployment drawing indicates an electronic drawing including the installation location or the deployment information. For example, the system controller 210 can identify the sensor device closest to the location information of the terminal 220 based on the sensor device deployment drawing including the location information of the installed sensor device, and determine that the identified sensor device is paired with the first gateway 200-1. The system controller 210 can store the sensor device ID received from the first gateway 200-1 as the ID of the identified sensor device. For example, it is assumed that the sensor device deployment drawing stored in the system controller 210 shows that two sensor devices are installed in a first area, one sensor device is installed in a second area, and one sensor device is installed in a third area. When the location information of the terminal 220 is close to the bottom left of the first area, the system controller 210 can recognize in the sensor device deployment drawing that the sensor device at the bottom left of the first area is paired with the first gateway 200-1. The system controller 210 can map and store the sensor device ID received from the first gateway 200-1 to the sensor device installed at the bottom left of the first area in the sensor device deployment drawing.

Additionally, the system controller 210 can identify the paired sensor device further using the height information as illustrated in FIG. 5A. For example, when multiple sensor devices are at the same location as the location information of the terminal 220 or when multiple sensor devices are within a threshold distance from the location of the terminal 220, the system controller 210 can identify the sensor device paired with the first gateway 200-1 based on the height information further obtained from the terminal 220.

Although not depicted, the system controller 210 can send a message including the ID registration information of the sensor device to the terminal 220. For example, the system controller 210 can send a message including the ID and the location information of the sensor device to the terminal 220. Upon receiving the message including the ID and the location information of the sensor device from the system controller 210, the terminal 220 can register the corresponding ID in the sensor device having the corresponding location information in the sensor device deployment drawing stored in the terminal 220, and display the pairing complete of the sensor device and the ID of the sensor device on the sensor device deployment drawing. For example, the system controller 210 can send the ID and the location information of the sensor device and the message including the identification information of the gateway paired with the corresponding sensor device, to the terminal 220. In so doing, the terminal 220 can register the corresponding ID in the sensor device having the corresponding location information in the stored sensor device deployment drawing, display the ID and the pairing complete of the sensor device on the sensor device deployment drawing, and display the gateway paired with the corresponding sensor device. For example, the system controller 210 can transmit the updated sensor device deployment drawing to the terminal 220. The terminal 220 can display the updated sensor device deployment drawing on the screen.

Figure 6:
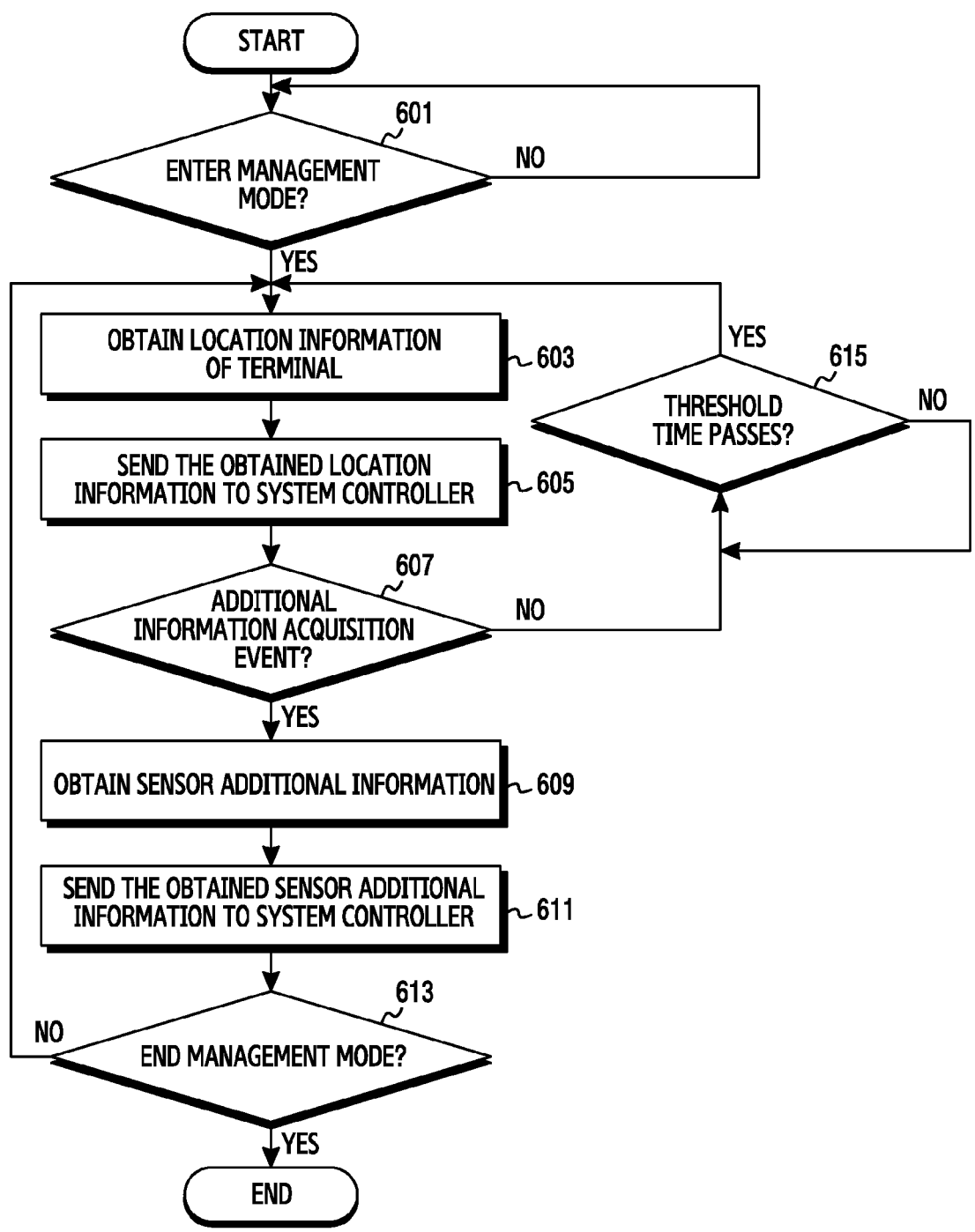
FIG. 6 is a flowchart illustrating example operations of a terminal in a wireless communication system according to an example embodiment of the present disclosure.

FIG. 6 is a flowchart illustrating example operations of a terminal in a wireless communication system according to an example embodiment of the present disclosure.

Referring to FIG. 6, the terminal 220 determines whether the management mode entry event occurs in operation 601. For example, the terminal 220 determines whether the management mode entry icon (or menu item) displayed on the screen is selected or a particular key button for the management mode entry is input. When the management mode entry icon is selected or the particular key button for the management mode entry is input, the terminal 220 can determine that the management mode entry event occurs.

In operation 603, the terminal 220 obtains its location information. For example, the terminal 220 can obtain its current location information through a location information receiver.

In operation 605, the terminal 220 can transmit its location information to the system controller 210. In so doing, the terminal 220 can send its location information to the system controller 210 using the wireless communication. The terminal 220 can generate the signal for requesting the system controller 210 to select the gateway to pair with the sensor device, and send the generated request signal including its location information.

In operation 607, the terminal 220 determines whether an additional information acquisition event occurs. For example, the terminal 220 can determine whether the additional information acquisition event occurs by detecting whether the user selects an additional information acquisition request icon (or menu item). For example, the terminal 220 can determine whether the additional information acquisition event occurs by detecting whether the user drives a component (e.g., a camera, an NFC module, or a barometer) used to acquire the additional information.

When the additional information acquisition event does not occur, the terminal 220 determines whether a threshold time passes in operation 615. For example, the terminal 220 determines whether the threshold time passes after the terminal location information is transmitted to the system controller 210. Herein, the terminal 220 determines whether the threshold time passes in order to periodically transmit the location information to the system controller 210 during the management mode. When the threshold time passes, the terminal 220 returns to operation 603 and performs the subsequent operation.

On the other hand, when the additional information acquisition event occurs, the terminal 220 obtains the sensor additional information in operation 609 and transmits the obtained sensor additional information to the system controller 210 in operation 611. Herein, the sensor additional information can include the identification information and the height information of the sensor device. For example, the terminal 220 can obtain the identification information of the sensor device through a camera. For example, the terminal 220 can obtain the identification information of the sensor device through an NFC module. For example, the terminal 220 can measure atmospheric pressure information through a barometer and obtain the height information of the sensor device based on the measured atmospheric pressure information. According to an embodiment, as acquiring the location information in operation 603, the terminal 220 may obtain the additional information. Upon acquiring the additional information together with the location information, the terminal 220 can transmit the location information and the additional information to the system controller 210 in operation 605.

In operation 613, the terminal 220 determines whether a management mode end event occurs. For example, the terminal 220 determines whether a management mode end icon (or menu item) displayed on the screen is selected or whether a particular key button for the management mode end is input. When the management mode end icon is selected or whether the particular key button for the management mode end is input, the terminal 220 can determine that the management mode end event occurs. The management mode entry icon and the management mode end icon may be the same icon or different icons. The management mode entry key button and the management mode end key button may be the same button or different buttons.

When the management mode end icon does not occur, the terminal 220 returns to operation 601 and perform the subsequent operation. On the other hand, when the management mode end icon occurs, the terminal 220 finishes the operations.

Figure 7:
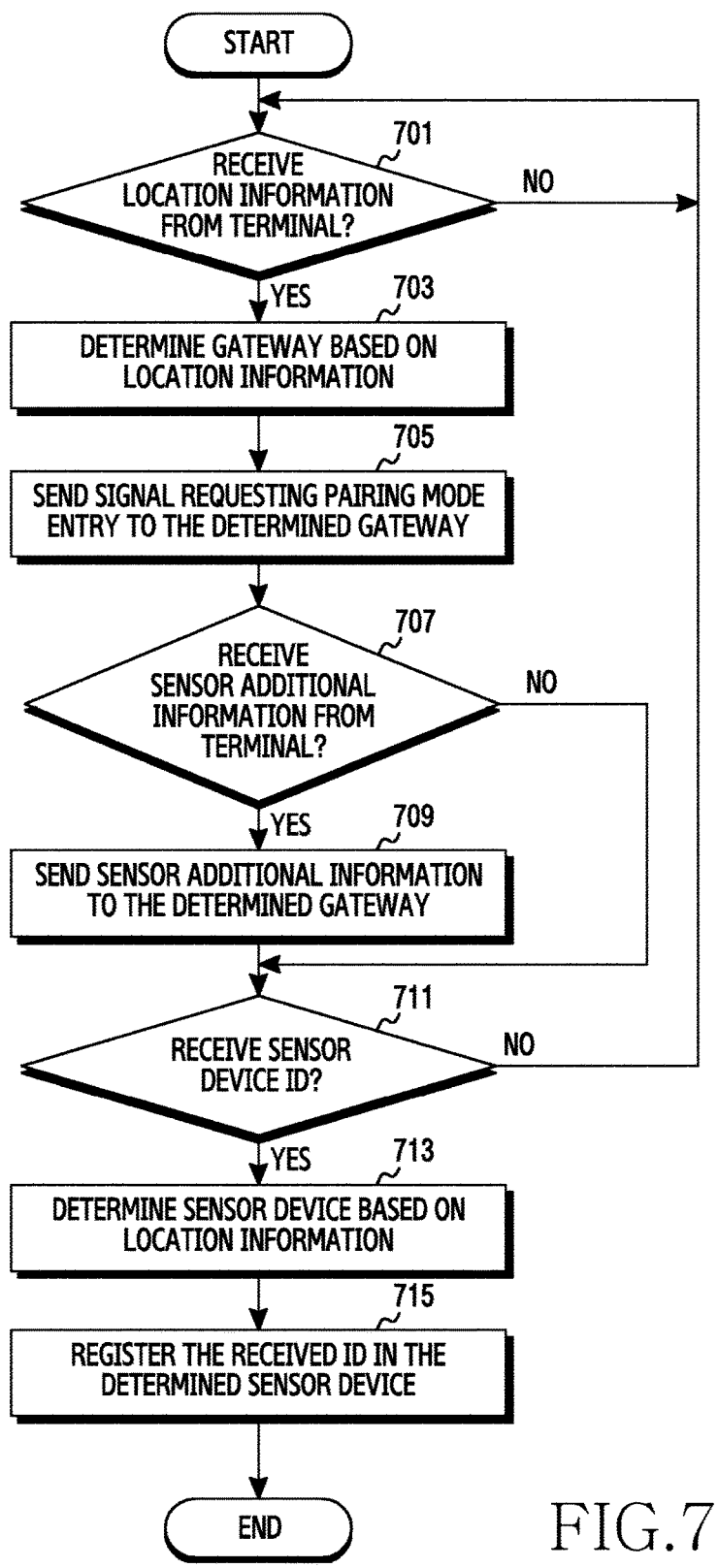
FIG. 7 is a flowchart illustrating example operations of a system controller in a wireless communication system according to an example embodiment of the present disclosure.

FIG. 7 is a flowchart illustrating example operations of a system controller in a wireless communication system according to an example embodiment of the present disclosure.

Referring to FIG. 7, the system controller 210 determines whether the location information is received from the terminal 220 in operation 701. Upon receiving the location information from the terminal 220, the system controller 210 determines the gateway based on the location information in operation 703. For example, the system controller 210 determines the gateway closest to the terminal 220 among the multiple gateways based on the pre-stored location information of the gateways and the location information of the terminal 220. The system controller 210 can recognize the determined gateway as the gateway to pair with the sensor device residing at the current location of the terminal. Additionally, based on the location information of the terminal 220 and the location information of the gateway closest to the terminal 220, the system controller 210 determines a distance between the terminal 220 and the corresponding gateway and compares the determined distance with a threshold distance. When the determined distance is greater than the threshold distance, the system controller 210 can determine no gateway corresponding to the location information of the terminal 220 and return to operation 701. On the other hand, when the determined distance is smaller than or equal to the threshold distance, the system controller 210 can determine the corresponding gateway as the gateway corresponding to the location information of the terminal 220. The system controller 210 compares location information currently received from the terminal 220 with location information previously received. When the current location information is the same as the previous location information, the system controller 210 can skip determining the gateway corresponding to the location information of the terminal 220 and return to operation 701.

In operation 705, the system controller 210 sends a signal requesting the pairing mode entry to the determined gateway. For example, the system controller 210 sends the signal for switching the gateway closest to the location of the terminal 220 among the multiple gateways, into the pairing mode.

In operation 707, the system controller 210 determines whether sensor additional information is received from the terminal 220. For example, the system controller 210 determines whether the sensor additional information such as identification information or height information of the sensor device is received from the terminal 220. When receiving no sensor additional information, the system controller 210 goes to operation 711.

On the other hand, upon receiving the sensor additional information, the system controller 210 transmits the sensor additional information to the determined gateway in operation 709. Herein, the system controller 210 can map and store the sensor additional information obtained in operation 707 with the terminal location information obtained in operation 701 to use them later on. For example, the system controller 210 can obtain the identification information and the height information of the sensor device from the sensor additional information, and generate and store location information (e.g., latitude, longitude, altitude information) of the sensor device based on the location information and the height information of the terminal 220. The system controller 210 can map and store the identification information and the location information of the sensor device, and display locations of the sensors on the 3D drawing based on such information. According to an embodiment, the system controller 210 may receive the location information together with the sensor additional information in operation 703. Upon receiving the location information together with the additional information, the system controller 210 can transmit the location information and the sensor additional information to the corresponding gateway in operation 705.

In operation 711, the system controller 210 detects whether the sensor device ID is received from the gateway. For example, the system controller 210 detects whether the pairing complete report message including the ID of the sensor device paired with the gateway is received from the gateway determined in operation 705. When not receiving the sensor device ID from the gateway, the system controller 210 can go back to operation 701.

On the other hand, when receiving the sensor device ID from the gateway, the system controller 210 determines the sensor device paired with the gateway based on the location information received from the terminal 220 in operation 713. For example, based on the sensor device deployment drawing and the terminal location information, the system controller 210 identifies the sensor device closest to the terminal location and determines the identified sensor device as the sensor device paired with the gateway.

In operation 715, the system controller 210 registers the sensor device ID received from the gateway as the ID of the sensor device paired with the gateway. For example, the system controller 210 can map and store the ID of the sensor device identified on the sensor device deployment drawing including the installation location or the deployment information of the sensor device.

Additionally, the system controller 210 can send to the terminal 220 a message including the ID registration information of the sensor device. For example, the system controller 210 can send the message indicating the ID of the sensor device having first location information, to the terminal 220. For example, the system controller 210 can send the updated sensor device deployment drawing to the terminal 220.

Figure 8:
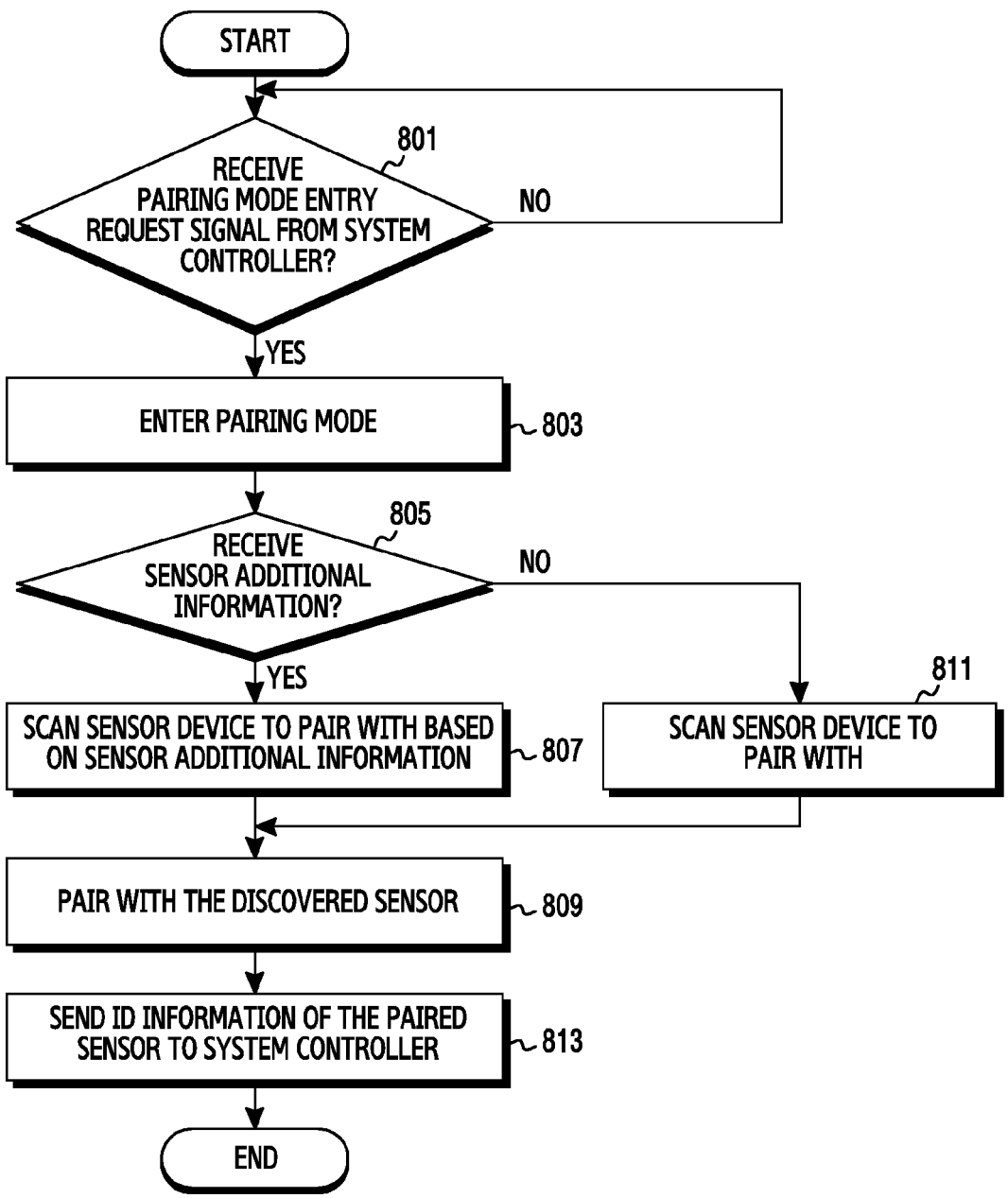
FIG. 8 is a flowchart illustrating example operations of a gateway in a wireless communication system according to an example embodiment of the present disclosure.

FIG. 8 is a flowchart illustrating example operations of a gateway in a wireless communication system according to an example embodiment of the present disclosure.

Referring to FIG. 8, the gateway 200 determines whether the pairing mode entry request signal is received from the system controller 210 in operation 801. For example, the gateway 200 not operating in the pairing mode determines whether the signal requesting to enter the pairing mode is received from the system controller 210.

When receiving the pairing mode entry request signal from the system controller 210, the gateway 200 enters the pairing mode in operation 803. Herein, the pairing mode can send or receive the pairing request signal in order to pair with at least one sensor device 201.

In operation 805, the gateway 200 determines whether the sensor additional information is received from the system controller 210. For example, the gateway 200 detects whether the sensor additional information such as identification information or height information of the sensor device is received from the system controller 210. When receiving no sensor additional information, the gateway 200 scans a sensor device to pair with in operation 811. For example, the gateway 200 can scan the sensor device to pair with by detecting the pairing request signal received. In operation 809, the gateway 200 can pair with the scanned sensor device.

On the other hand, upon receiving the sensor additional information, the gateway 200 can scan a sensor device to pair with based on the sensor additional information in operation 807. For example, the gateway 200 can obtain the identification information and the height information of the sensor device from the sensor additional information, detect the reception of the pairing request signal containing the same sensor identification information as the obtained sensor identification information, and thus discover the sensor device to pair with. In operation 809, the gateway 200 can pair with the discovered sensor device. When pairing with the discovered sensor device, the gateway 200 can allocate an ID to the discovered sensor device.

In operation 813, the gateway 200 transmits the ID information of the paired sensor device to the system controller 210. For example, the gateway 200 can send a pairing complete report message including the ID information of the paired sensor device to the system controller 210.

Next, the gateway 200 finishes this process.

Additionally, the gateway 200 can control the paired sensor device based on the sensor additional information. For example, based on the height information of the paired sensor devices, the gateway 200 can create control information for controlling each sensor device. For example, the control information can include temperature control information or humidity control information based on the height information of the paired sensor devices.

FIG. 9 is a signal flow diagram illustrating example pairing of a gateway and a sensor device in a wireless communication system according to an example embodiment of the present disclosure.

As illustrated in FIG. 9, the gateway 200-1 broadcasts a beacon signal in operation 900. For example, the gateway 200-1 switches to the pairing mode based on a request of the system controller 210 and then broadcasts the beacon signal including its information in order to notify the various sensor devices 201 of its presence. The gateway 200-1 can periodically broadcast the beacon signal during a preset time. Next, the gateway 200-1 can detect whether a pairing request signal is received.

The sensor device 201-1 can operate in the pairing mode under user control and receive the beacon signal from the gateway 200-1. The sensor device 201-1 sends the pairing request signal to the gateway 200-1 in operation 910. According to an example embodiment, based on the information in the beacon signal, the sensor device 201-1 can determine whether it can pair with the gateway 200-1. The pairing request signal can include the identification information of the sensor device 201-1. For example, the pairing request signal can include one of the MAC address, the PIN, the QR code, and the serial number.

After receiving the pairing request signal, the gateway 200-1 can send a pairing response signal to the sensor device 201-1 which sends the pairing request signal in operation 920. According to an example embodiment, the gateway 200-1 can compare the sensor device identification information obtained from the system controller 210 with the identification information of the pairing request signal, and thus confirm that the sensor device 201-1 sending the pairing request signal is requested by the system controller 210 to pair with. For example, when the sensor device identification information obtained from the system controller 210 is the same as the identification information of the pairing request signal, the gateway 200-1 can send the pairing response signal indicating the pairing feasible to the sensor device 201-1 which sends the pairing request signal. On the other hand, when the sensor device identification information obtained from the system controller 210 is not the same as the identification information of the pairing request signal, the gateway 200-1 can send or may not send a pairing response signal indicating the pairing infeasible to the sensor device 201-1 which sends the pairing request signal.

In operation 930, the sensor device 201-1 and the gateway 200-1 can exchange various information for the communication. For example, the sensor device 201-1 and the gateway 200-1 can exchange identification information for the communication, an encryption key, and other information. Herein, the identification information for the communication can include, for example, and without limitation, the ID of the sensor device 201-1 allocated by the gateway 200 for the communication with the sensor device 201-1. The encryption key can include a necessary key for the communication after the gateway 200 pairs with the sensor device 201-1. The other information can include the additional information of the sensor device 201.

Next, the sensor device 201-1 and the gateway 200-1 can complete the pairing and communicate with each other. The pairing of FIG. 9 is illustrated in brief to facilitate the understanding, and the present disclosure is not limited to such pairing. For example, the pairing can include an additional operation besides the operations of FIG. 9. Each operation in FIG. 9 can be divided into one or more operations. For example, operation 930 of FIG. 9 can include exchanging the identification information, exchanging the encryption key, and exchanging the other information.

Now, explanations describe a method for, when a plurality of air conditioning devices requiring no pairing is installed, registering the installed air conditioning devices and entering a communication state according to another example embodiment. Hereinafter, it is assumed that the air conditioning device is, but not limited to, a System Air Conditioner (SAC) to aid in understanding. For example, the present disclosure can be equally applied to SACs or electronic devices enabling wireless or wired communication with the system controller.

Figure 10:
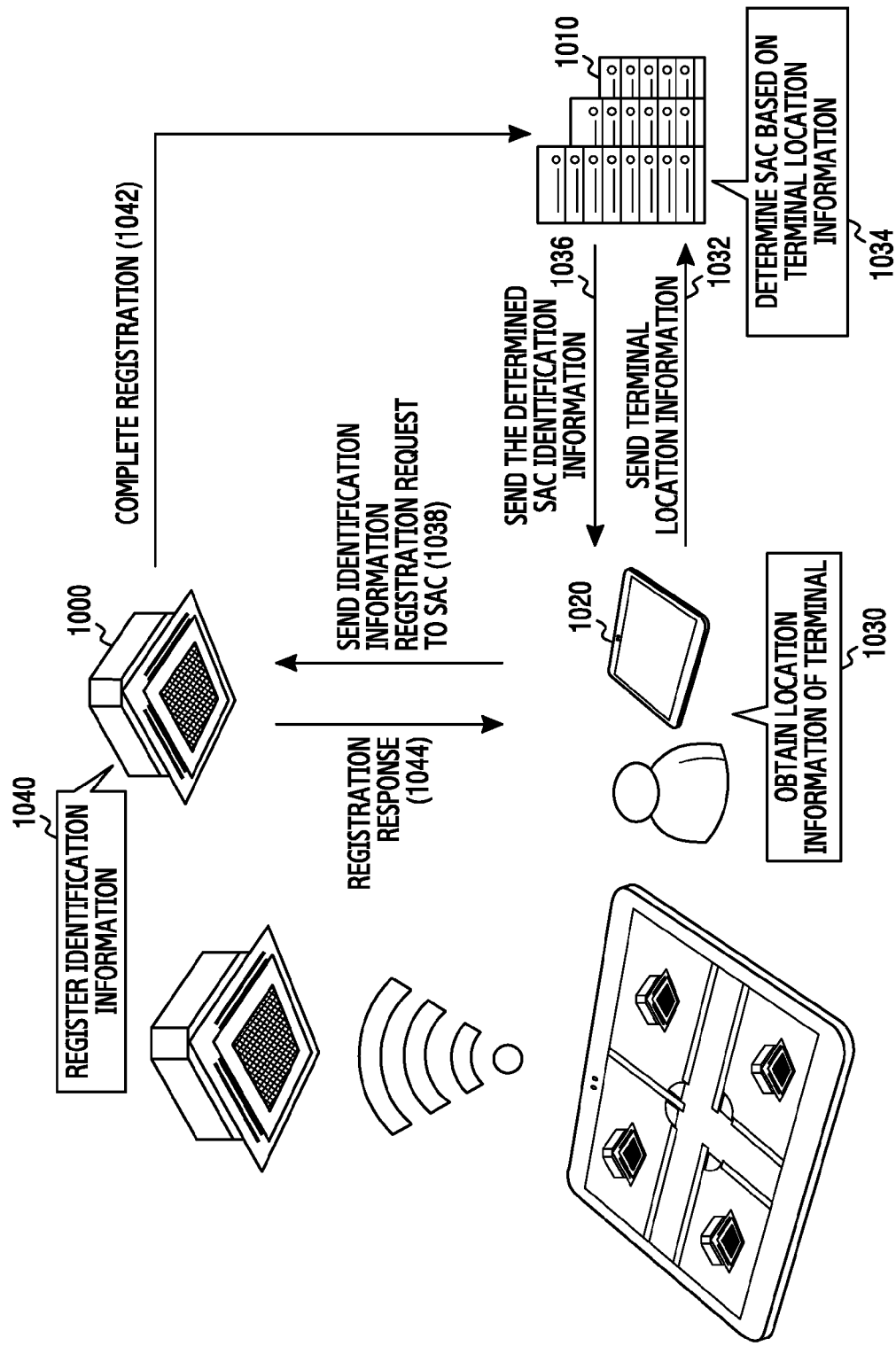
FIG. 10 is a diagram illustrating example sensor device registration in a wireless communication system according to another example embodiment of the present disclosure.

FIG. 10 is a diagram illustrating example SAC registration in a wireless communication system according to another example embodiment of the present disclosure.

Referring to FIG. 10, a terminal 1020 obtains its location information under user control in operation 1030. For example, the terminal 1020 enters a mode for registering an SAC under the user control and obtains its current location.

In so doing, the terminal 1020 can display an electronic map indicating installation locations or deployment information of SACs on a screen.

The terminal 1020 transmits its current location information to a system controller 1010 in operation 1032. For example, to request to send identification information of the SAC 1000 corresponding to the current location information of the terminal 1020, the terminal 1020 can transmit its current location information to the system controller 1010.

The system controller 1010 determines an SAC based on the location information of the terminal 1020 in operation 1034. For example, the system controller 1010 can select the SAC 1000 installed at a location corresponding to the location information of the terminal 1020 on a pre-stored electronic drawing showing the installation locations or the deployment information of the SACs. The electronic drawing can include the installation locations and identification information of the SACs.

The system controller 1010 transmits the identification information of the determined SAC 1000 to the terminal 1020 in operation 1036. The system controller 1010 obtains the identification information of the determined SAC 1000 from the pre-stored electronic drawing, and transmits the obtained identification information of the SAC 1000 to the terminal 1020. According to an example embodiment, the system controller 1010 can transmit to the terminal 1020 the identification information of the SAC 1000 with configuration information of the SAC 1000. Herein, the configuration information can include various information for the operations of the SAC 1000.

The terminal 1020 receiving the identification information of the SAC 1000 from the system controller 1010 sends a signal requesting identification information registration to the SAC 1000 in operation 1038. For example, based on the IR or the beamforming, the terminal 1020 can send the signal requesting the identification information registration to the corresponding SAC 1000 located in a particular direction. In so doing, the signal requesting the identification information registration should include the identification information of the SAC 1000 received from the system controller 1010. According to an example embodiment, when receiving the identification information and the configuration information of the SAC 1000 from the system controller 1010, the terminal 1020 can forward the identification information and the configuration information of the SAC 1000 to the SAC 1000 in operation 1038.

The SAC 1000 receiving the identification information registration request signal from the terminal 1020 registers the identification information in operation 1040. For example, the SAC 1000 can obtain and store its identification information from the received identification information registration request signal. When receiving the configuration information from the terminal 1020, the SAC 1000 can control states or setting values of its components according to the configuration information.

Upon completing the identification information registration, the SAC 1000 can send a signal indicating the registration complete to the system controller 1010 in operation 1042. Herein, the signal indicating the registration complete can include the identification information of the SAC 1000 so that the system controller 1010 can recognize that the registration complete signal is received from the SAC 1000. The SAC 1000 can send a registration response signal indicating the identification information registration complete to the terminal 1020 in operation 1044. According to an example embodiment, the SAC 1000 can skip operation 1044. Herein, the SAC 1000 completing the identification information registration can receive a control signal from the system controller 1010 and operate according to the received control signal.

When receiving the signal indicating the registration complete from the SAC 1000 in operation 1042, the system controller 1010 stores information indicating the identification information registration complete of the SAC 1000. According to an embodiment, the system controller 1010 can send to the terminal 1020 a signal indicating that the identification information of the SAC 1000 is normally registered. The system controller 1010 can send a control signal for controlling the SAC 1000 based on the identification information of the SAC 1000.

Upon receiving the registration response signal from the SAC 1000 in operation 1044, the terminal 1020 can display a message or a graphical effect indicating that the identification information of the SAC 1000 at the corresponding location is normally registered, on the electronic drawing on the screen. When not receiving the registration response signal within a threshold time after the identification information registration request signal is transmitted in operation 1038, the terminal 1020 can re-send the identification information registration request signal to the SAC 1000. That is, the terminal 1020 can periodically send the identification information registration request signal to the SAC 1000 until the registration response signal is received.

According to an example embodiment, the terminal 1020 can receive from the system controller 1010 the signal indicating that the identification information of the SAC 1000 is normally registered, instead of the registration response signal in operation 1044. Upon receiving the signal indicating that the identification information of the SAC 1000 is normally registered from the system controller 1010, the terminal 1020 can display a message or a graphical effect indicating that the identification information of the SAC 1000 at the corresponding location is normally registered, on the electronic drawing on the screen. When not receiving the signal indicating that the identification information of the SAC 1000 is normally registered from the system controller 1010 within the threshold time after the identification information registration request signal is transmitted in operation 1038, the terminal 1020 can re-send the identification information registration request signal to the SAC 1000.

As such, since the terminal 1020 obtains the identification information of the corresponding SAC based on its location information and transmits the identification information to the corresponding SAC, the SAC identification information can be easily registered. For example, the SAC identification information can be registered without the user's recognizing and selecting in person the SAC 1000 on the electronic drawing and directly inputting the ID to the SAC 1000. Also, as the terminal transmits the identification information to the corresponding SAC, the system controller 1010 can send the control signal to the SAC 1000 and the SAC 1000 can receive the control signal and operate according to the received control signal.

Figure 11:
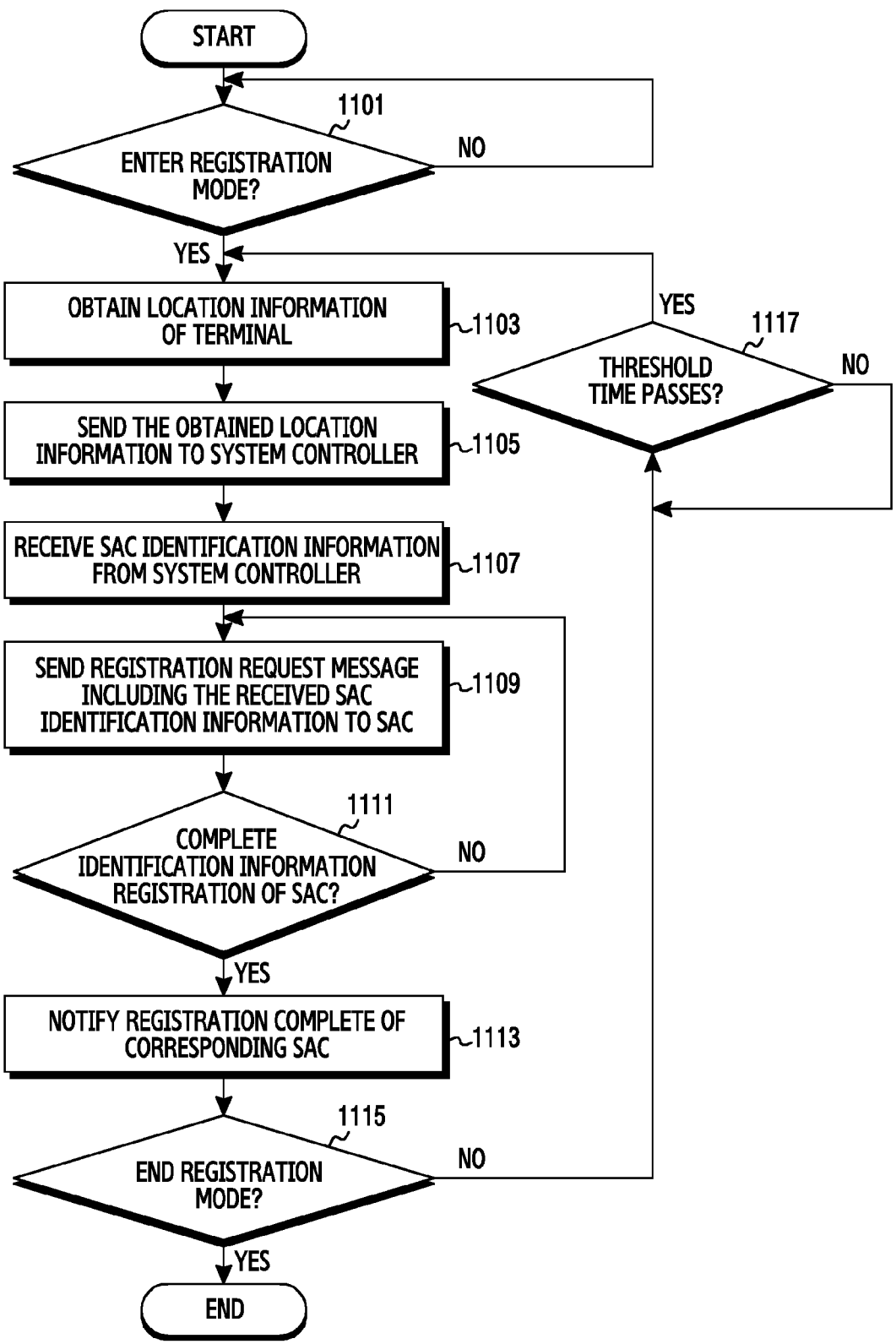
FIG. 11 is a flowchart illustrating example operations of a terminal in a wireless communication system according to another example embodiment of the present disclosure.

FIG. 11 is a flowchart illustrating example operations of a terminal in a wireless communication system according to another example embodiment of the present disclosure.

Referring to FIG. 11, the terminal 1020 determines whether a registration mode entry event occurs in operation 1101. For example, the terminal 1020 determines whether a registration mode entry icon (or menu item) displayed on the screen is selected or whether a particular key button for the registration mode entry is input. When the registration mode entry icon is selected or the particular key button for the registration mode entry is input, the terminal 1020 can determine the occurrence of the registration mode entry event. Herein, the registration mode registers a SAC. According to an embodiment, upon entering the registration mode, the terminal 1020 can display the electronic drawing indicating the installation locations or the deployment information of the SACs on the screen.

In operation 1103, the terminal 1020 obtains its location information. For example, the terminal 1020 can obtain its current location information through a location information receiver.

In operation 1105, the terminal 1020 transmits its location information to the system controller 1010. In so doing, the terminal 1020 can send its location information to the system controller 1010 using the wireless communication. According to an example embodiment, the terminal 1020 can send to the system controller 1010 the signal requesting the identification information of the SAC 1000 corresponding to its current location information.

In operation 1107, the terminal 1020 receives the identification information of the SAC 1000 from the system controller 1010. In so doing, the terminal 1020 can receive the identification information from the system controller 1010 using the wireless communication. According to an embodiment, the terminal 1020 can receive the configuration information of the SAC 1000 together with the identification information of the SAC 1000.

In operation 1109, the terminal 1020 sends the registration request message including the received SAC identification information to the SAC 1000. According to an example embodiment, based on the IR or the beamforming, the terminal 1020 can send the signal requesting the identification information registration to the corresponding SAC 1000 located in a particular direction. When receiving the identification information and the configuration information of the SAC 1000 in operation 1107, the terminal 1020 can forward the registration request message including the identification information and the configuration information of the SAC 1000 to the SAC 1000 in operation 1109.

In operation 1111, the terminal 1020 detects whether the identification information registration of the SAC 1000 is completed. For example, the terminal 1020 can detect whether the registration response message indicating the identification information registration complete is received from the SAC 1000, or whether a notification message indicating the identification information registration complete of the SAC 1000 is received from the system controller 1010. For example, when receiving the registration response message from the SAC 1000, the terminal 1020 can detect that the identification information registration of the SAC 1000 is completed. When receiving the notification message indicating the registration complete of the SAC 1000 from the system controller 1010, the terminal 1020 can detect that the identification information registration of the SAC 1000 is completed. When not receiving the registration complete message from the SAC 1000 or the system controller 1010, the terminal 1020 can re-send the registration request message including the identification information to the SAC 1000 in operation 1109.

On the other hand, when detecting the registration complete of the identification information, the terminal 1020 can notify the registration complete of the corresponding SAC to the user in operation 1113. For example, the terminal 1020 can display a graphical effect or a message indicating that the identification information of the SAC 1000 is normally registered. The graphical effect or the message can be displayed on the electronic drawing showing the locations or the deployment information of the SACs. For example, the terminal 1020 can output a sound signal or produce vibration in order to notify that the identification information of the SAC 1000 is normally registered.

In operation 1115, the terminal 1020 determines whether a registration mode end event occurs. For example, the terminal 1020 determines whether a registration mode end icon (or menu item) displayed on the screen is selected or whether a particular key button for the registration mode end is input. When the registration mode end icon is selected or the particular key button for the registration mode end is input, the terminal 1020 can determine the occurrence of the registration mode end event. The registration mode entry icon and the registration mode end icon may be the same icon or different icons. The registration mode entry key button and the registration mode end key button may be the same button or different buttons.

When the registration mode end icon does not occur, the terminal 1020 determines whether a threshold time passes in operation 1117. For example, the terminal 1020 determines whether the threshold time passes from the transmission of the terminal location information to the system controller 1010. Herein, the terminal 1020 determines whether the threshold time passes in order to periodically transmit the location information to the system controller 1010 during the management mode. When the threshold time passes, the terminal 1020 returns to operation 1103 and performs the subsequent operation.

On the other hand, when the registration mode end icon occurs, the terminal 1020 finishes this process.

Figure 12:
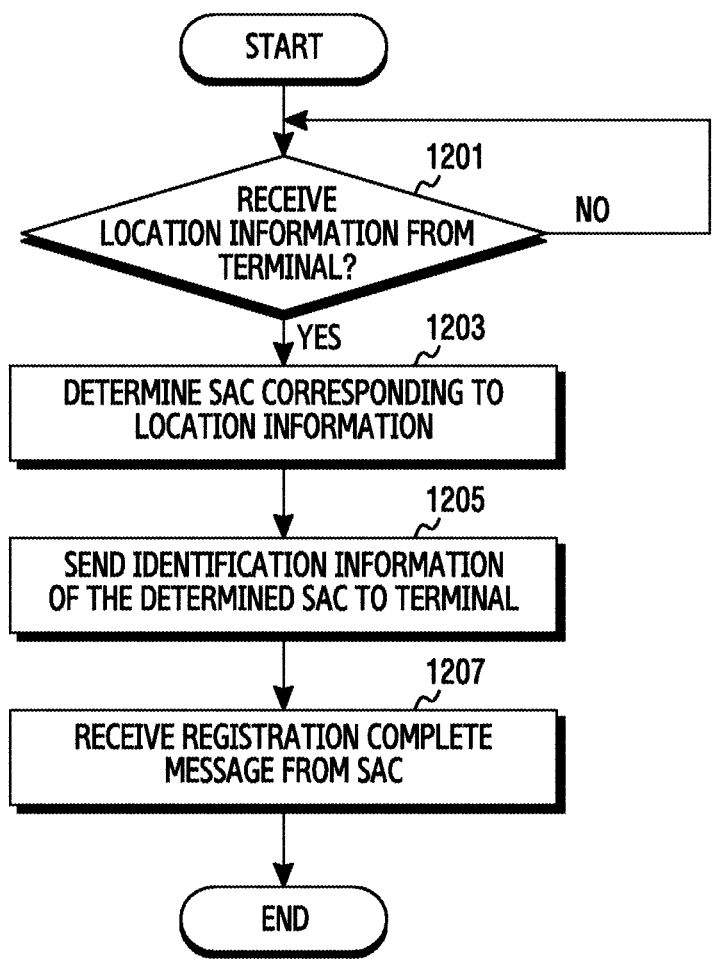
FIG. 12 is a flowchart illustrating example operations of a system controller in a wireless communication system according to another example embodiment of the present disclosure.

FIG. 12 is a block diagram illustrating example operations of a system controller in a wireless communication system according to another example embodiment of the present disclosure.

Referring to FIG. 12, the system controller 1010 determines whether the location information is received from the terminal 1020 in operation 1201. Upon receiving the location information from the terminal 1020, the system controller 1010 determines the SAC based on the location information in operation 1203. For example, the system controller 1010 confirms the location information of each SAC on the electronic drawing showing the locations or the deployment information of the SACs. Next, the system controller 1010 can determine the SAC closest to the terminal 1020 among the multiple SACs based on the location information of the terminal 1020. Additionally, based on the location information of the terminal 1020 and the location information of the SAC closest to the terminal 1020, the system controller 1010 determines a distance between the terminal 1020 and the corresponding SAC and compares the determined distance with a threshold distance. When the determined distance is greater than the threshold distance, the system controller 1010 can determine no SAC corresponding to the location information of the terminal 1020 and return to operation 1201. On the other hand, when the determined distance is smaller than or equal to the threshold distance, the system controller 1010 can determine the corresponding SAC as the SAC corresponding to the location information of the terminal 1020. The system controller 1010 compares location information currently received from the terminal 1020 with location information previously received. When the current location information is the same as the previous location information, the system controller 1010 can skip determining the SAC corresponding to the location information of the terminal 1020 and go back to operation 1201.

In operation 1205, the system controller 1010 sends the identification information of the determined SAC 1000 to the terminal 1020. According to an example embodiment, the system controller 1010 can send the identification information and the configuration information of the SAC 1000 to the terminal 1020.

In operation 1207, the system controller 1010 can receive the registration complete message from the SAC 1000. Herein, the registration complete message can include the identification information of the SAC 1000. Based on the identification information in the received registration complete message, the system controller 1010 can recognize that the registration complete message is received from the SAC 1000 and that the identification information registration of the SAC 1000 is completed.

Next, the system controller 1010 can return to operation 1201.

Figure 13:
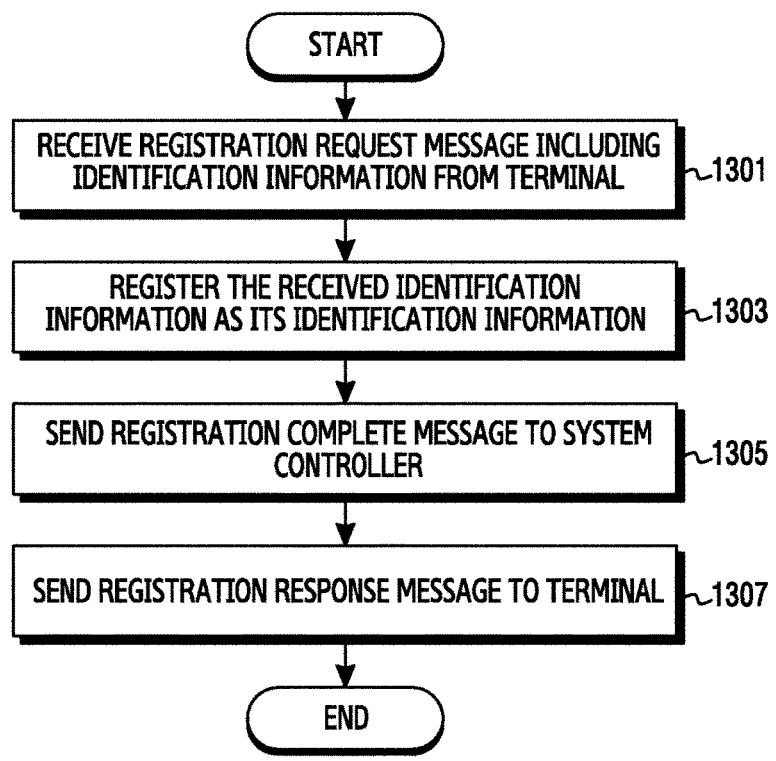
FIG. 13 is a flowchart illustrating example operations of a sensor device in a wireless communication system according to another example embodiment of the present disclosure.

FIG. 13 is a flowchart illustrating example operations of a SAC in a wireless communication system according to an example embodiment of the present disclosure.

Referring to FIG. 13, in operation 1301, the SAC 1000 which is the air conditioning device receives the registration request message including the identification information from the terminal 1020. According to an example embodiment, the registration request message can include the identification information and the configuration information of the SAC 1000.

In operation 1303, the SAC 1000 registers the received identification information as its identification information. The SAC 1000 does not know its identification information until it receives the identification information from the terminal 1020. Accordingly, the SAC 1000 can register the identification information of the registration request message received from the terminal 1020, as its identification information. When the registration request message contains the configuration information of the SAC 1000, the SAC 1000 can configure its hardware and/or software based on the configuration information.

In operation 1305, the SAC 1000 sends the registration complete message to the system controller 1010. Herein, the registration complete message can include the identification information of the SAC 1000. The SAC 1000 sends the registration response message to the terminal 1020 in operation 1307. For example, in response to the registration request message received from the terminal 1020, the SAC 1000 can send the registration response message to the terminal 1020. According to an embodiment, the SAC 1000 can perform only one of operation 1305 and operation 1307.

Next, the SAC 1000 finishes this process.

Figure 14:
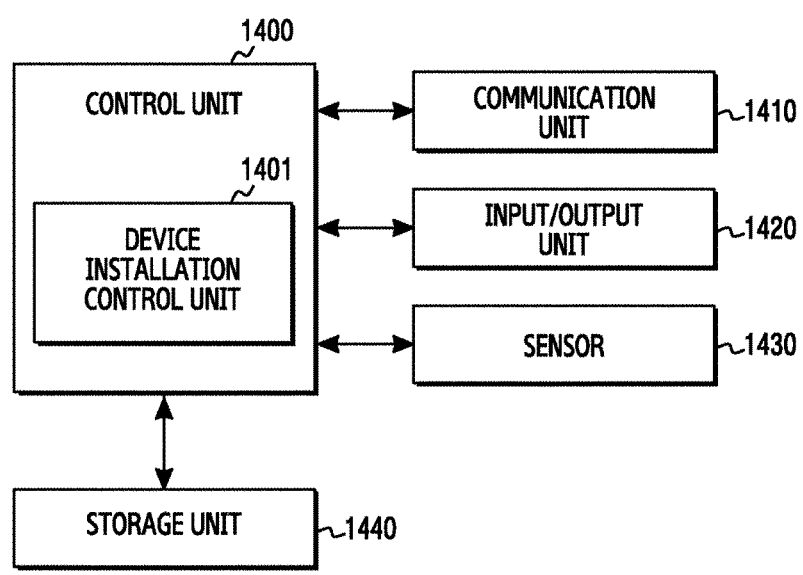
FIG. 14 is a diagram illustrating an example terminal in a wireless communication system according to various example embodiments of the present disclosure.

FIG. 14 is a block diagram illustrating an example terminal in a wireless communication system according to various example embodiments of the present disclosure. Hereafter, a term such as 'part' or '~er' indicate a unit for processing at least one function or operation, and can be implemented using hardware, software, or a combination of hardware and software. Herein, the terminal embraces at least one of the terminal 220 and the terminal 1020.

Referring to FIG. 14, the terminal can include a control unit (e.g., including processing circuitry and may include a program module) 1400, a communication unit (e.g., including communication circuitry) 1410, an input/output unit (e.g., including input/output circuitry) 1420, a sensor 1430, and a storage unit 1440.

The control unit 1400 can include various processing circuitry, such as, for example, and without limitation, at least one processor. The control unit 1400 controls and processes the operations of the terminal. The control unit 1400 may include a device installation control unit 1401 that may include hardware, software or a combination thereof, such as, for example, and without limitation, a program module, and processes the device installation control unit 1401 to send various information required for the pairing between the sensor device and the gateway to the system controller under the user control. For example, when entering the sensor device management mode under the user control, the device installation control unit 1401 can control to periodically obtain the terminal location information and to send the obtained information to the system controller. The device installation control unit 1401 can control to obtain the identification information of the sensor device and to send the obtained identification information to the system controller. Herein, the identification information of the sensor device can be obtained from the image captured by the camera of the terminal or using the short-range wireless communication. The device installation control unit 1401 can control to obtain the additional information of the sensor device and to send the obtained additional information to the system controller. For example, the device installation control unit 1401 can control to obtain the height information of the sensor device through the barometer and to send the obtained height information to the system controller. According to another example embodiment, the device installation control unit 1401 can control the registration of the SAC. For example, the device installation control unit 1401 can control to enter the registration mode for the SAC under the user control and to send the terminal location information to the system controller. Also, the device installation control unit 1401 can obtain the identification information of the SAC from the system controller in the registration mode. According to another embodiment, the device installation control unit 1401 can send the identification information of the SAC obtained from the system controller, to the SAC. In so doing, the device installation control unit 1401 can send the identification information of the SAC to the SAC at a particular location using the beamforming communication or the IR communication. According to another example embodiment, the device installation control unit 1401 can receive the information indicating the successful identification information registration of the SAC from the system controller or the SAC. After sending the identification information to the SAC, the device installation control unit 1401 can repeatedly send the identification information of the SAC to the SAC until the information indicating the SAC identification information registration is received. Upon receiving the information indicating the successful identification information registration of the SAC, the device installation control unit 1401 can control to display a graphical effect, to display a message, to output a sound signal, or to produce vibration in order to notify the identification information registration of the SAC to the user.

The communication unit 1410 may include various communication circuitry and may connect the communication with at least one of the sensor device, the SAC, and the system controller. For example, the communication unit 1410 can communicate with at least one of the sensor device, the SAC, and the system controller through the wireless communication or the wired communication. The wireless communication can include at least one of, for example, Wireless Fidelity (WiFi), Bluetooth (BT), NFC, RFID, Global Positioning System (GPS), Zigbee, IR, Z-wave, and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). The wired communication module can include, for example, at least one of Universal Serial Bus (USB), High Definition Multimedia Interface (HDMI), Recommended Standard 232 (RS-232), and Plain Old Telephone Service (POTS).

The input/output unit 1420 can include various input/output circuitry, including an input unit including input circuitry for receiving data or a command from the user, and a display unit including a display for displaying under control of the control unit 1400. The input/output unit 1420 can include a sound output unit including sound output circuitry for outputting sound data and a vibration generation unit including vibration generation circuitry for producing vibration. According to an example embodiment, the input/output unit 1420 can include various input/output circuitry, such as, for example, and without limitation, a touch screen which receives and displays a user input through a touch sensor under the control of the control unit 1400. The input/output unit 1420 can include various input/output circuitry, such as, for example, and without limitation, at least one key button.

The sensor 1430 can include a camera sensor for obtaining sensor device information and at least one sensor such as a barometric sensor. The camera sensor can obtain and provide the sensor device identification information to the control unit 1400, and the barometric sensor can measure and provide the atmospheric pressure information to the control unit 1400.

The storage unit 1440 stores necessary information and a program for the operations of the terminal. According to an example embodiment, the storage unit 1440 can store the electronic drawing showing the locations or the deployment information of the sensor devices. According to another example embodiment, the storage unit 1440 can store the electronic drawing showing the locations or the deployment information of the SACs.

Figure 15:
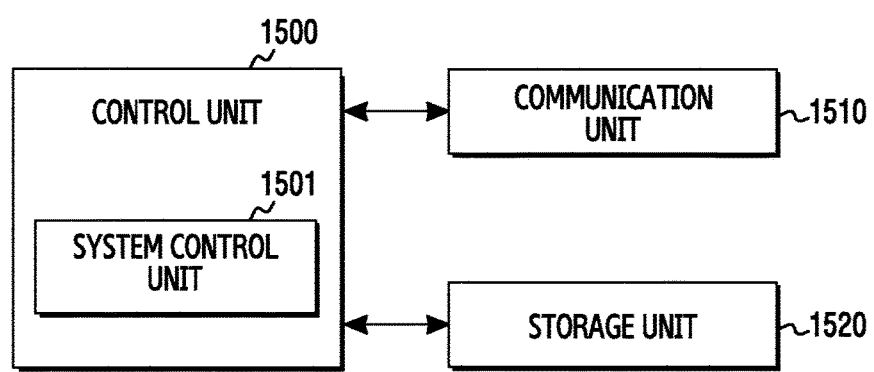
FIG. 15 is a block diagram illustrating an example system controller in a wireless communication system according to various example embodiments of the present disclosure.

FIG. 15 is a block diagram illustrating an example system controller in a wireless communication system according to various example embodiments of the present disclosure. Hereafter, a term such as 'part' or '~er' indicate a unit for processing at least one function or operation, and can be implemented using hardware, software, or a combination of hardware and software. Herein, the system controller embraces at least one of the system controller 210 and the system controller 1010.

Referring to FIG. 15, the system controller can include a control unit (e.g., including processing circuitry and may include a program module) 1500, a communication unit (e.g., including communication circuitry) 1510, and a storage unit 1520.

The control unit 1500 can include various processing circuitry, such as, for example, and without limitation, at least one processor. The control unit 1500 controls and processes the operations of the system controller. The control unit 1500 includes a system control unit 1501 that may include various hardware and/or software, such as, for example, and without limitation, a program module, and can provide control to pair the gateway and the sensor device and to register the sensor device through the system control unit 1501. The system control unit 1501 can receive the location information from the terminal and determine one of the gateways based on the received location information. The system control unit 1501 can control to send the signal requesting the pairing mode entry to the determined gateway. The system control unit 1501 can obtain the information about at least one of the sensor devices from the terminal and send the obtained information to the determined gateway. The sensor device information can include the identification information and the additional information (e.g., the height information) of the sensor device. The system control unit 1501 receives the ID of the sensor device paired with the gateway, from the gateway. The system control unit 1501 determines the sensor device paired with the gateway on the electronic drawing based on the location information received from the terminal. For example, based on the location information of the terminal, the system control unit 1501 identifies the sensor device closest to the terminal location among the deployed sensor devices on the electronic drawing, and determines the identified sensor device as the sensor device paired with the gateway. The system control unit 1501 registers the sensor device ID received form the gateway as the ID of the sensor device paired with the gateway. For example, the system control unit 1501 can map and store the sensor device ID received from the gateway with the sensor device identified on the electronic drawing including the installation locations or the deployment information of the sensor devices. Additionally, the system control unit 1501 can send the message including the ID registration information of the sensor device to the terminal. For example, the system control unit 1501 can send the message including the location information and the ID of the sensor device to the terminal. For example, the system control unit 1501 can send the updated sensor device deployment drawing to the terminal. For example, the system control unit 1501 can send to the terminal the message including the location information and the ID of the sensor device and the ID information (e.g., the ID) of the gateway paired with the corresponding sensor device.

According to another example embodiment, the system control unit 1501 can retrieve the identification information of the SAC based on the terminal location information, and send the retrieved SAC identification information to the terminal. The system control unit 1501 can receive from the SAC the signal indicating the identification information of the SAC is registered in the corresponding SAC. The system control unit 1501 can send the signal indicating the SAC identification information registered, to the terminal.

The communication unit 1510 may include various communication circuitry and can connect the communication with the terminal, the gateway, and the sensor device. For example, the communication unit 1510 can communicate with at least one of the terminal, the gateway, and the sensor device through the wireless communication or the wired communication. The wireless communication can include at least one of, for example, WiFi, BT, NFC, RFID, GPS, Zigbee, IR, Z-wave, and cellular communication (e.g., LTE, LTE-A, CDMA, WCDMA, UMTS, WiBro, or GSM). The wired communication module can include, for example, at least one of USB, HDMI, RS-232, and POTS.

The storage unit 1520 stores information and a program required for the operations of the system controller. According to an example embodiment, the storage unit 1520 can store the electronic drawing showing the locations or the deployment information of the gateways. The storage unit 1520 can store the electronic drawing showing the locations or the deployment information of the sensor devices. The storage unit 1520 can store the electronic drawing showing the locations or the deployment information of the SACs.

Figure 16:
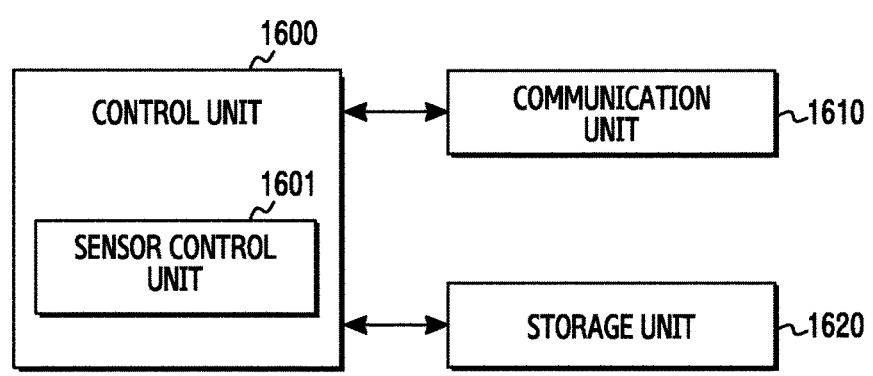
FIG. 16 is a block diagram illustrating an example gateway in a wireless communication system according to various example embodiments of the present disclosure.

FIG. 16 is a block diagram illustrating an example gateway in a wireless communication system according to various example embodiments of the present disclosure. Hereafter, a term such as 'part' or '~er' indicate a unit for processing at least one function or operation, and can be implemented using hardware, software, or a combination of hardware and software. Herein, the gateway can include one of the gateways 200-1 through 200-N.

Referring to FIG. 16, the gateway can include a control unit (e.g., including processing circuitry and may include a program module) 1600, a communication unit (e.g., including communication circuitry) 1610, and a storage unit 1620.

The control unit 1600 can include various processing circuitry, such as, for example, and without limitation, at least one processor. The control unit 1600 controls and processes the operations of the gateway. The control unit 1600 includes a sensor control unit 1601 that may include various sensor control hardware and/or software, such as, for example, and without limitation, a program module that can control to pair with the sensor and to control the paired sensor through the sensor control unit 1601. The sensor control unit 1601 can control to enter the pairing mode under the control of the system controller and to pair with one sensor device. Herein, the pairing mode can send or receive the pairing request signal in order to conduct the pairing. The sensor control unit 1601 can control to receive the sensor identification information from the system controller and to pair with the sensor device corresponding to the received sensor identification information. The sensor control unit 1601 can receive the additional information of the sensor device from the system controller in the pairing and control at least one sensor device paired based on the additional information. For example, the sensor control unit 1601 can obtain the information indicating that the height information of the first sensor device 201-1 is 0 m and the height information of the second sensor device 201-2 is 2 m, and generate the control information for the first sensor device 201-1 and the second sensor device 201-2 based on the height difference of the first sensor device 201-1 and the second sensor device 201-2. When pairing with the scanned sensor device, the sensor control unit 1601 can allocate the ID to the scanned sensor device. The sensor control unit 1601 sends the ID information of the paired sensor device to the system controller. For example, the sensor control unit 1601 can send the pairing complete report message including the ID information of the paired sensor device, to the system controller.

The communication unit 1610 can include various communication circuitry and can connect the communication with the system controller and the sensor device. For example, the communication unit 1610 can communicate with at least one of the system controller and the sensor device through the wireless communication or the wired communication. The wireless communication can include at least one of, for example, WiFi, BT, NFC, RFID, GPS, Zigbee, IR, Z-wave, and cellular communication (e.g., LTE, LTE-A, CDMA, WCDMA, UMTS, WiBro, or GSM). The wired communication module can include, for example, at least one of USB, HDMI, RS-232, and POTS.

The storage unit 1620 stores information and a program required for the operations of the gateway. According to an example embodiment, the storage unit 1620 can store the identification information of the paired sensor device, and the control information.

Figure 17:
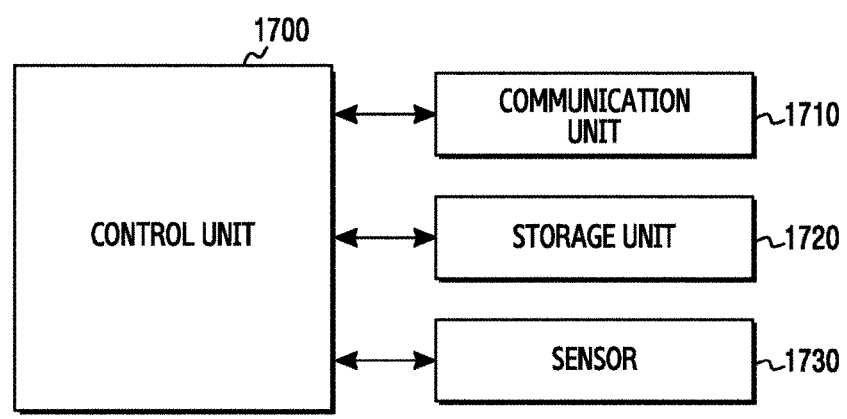
FIG. 17 is a block diagram illustrating an example sensor device in a wireless communication system according to various example embodiments of the present disclosure.

FIG. 17 is a block diagram illustrating an example sensor device in a wireless communication system according to various example embodiments of the present disclosure. Hereafter, a term such as 'part' or '~er' indicate a unit for processing at least one function or operation, and can be implemented using hardware, software, or a combination of hardware and software. Herein, the sensor device can include one of the sensor devices 201-1 through 201-N and the SAC 1000.

Referring to FIG. 17, the sensor device can include a control unit (e.g., including processing circuitry) 1700, a communication unit (e.g., including communication circuitry) 1710, a storage unit 1720, and a sensor 1730.

The control unit 1700 can include various processing circuitry, such as, for example, and without limitation, at least one processor. The control unit 1700 controls and processes the operations of the sensor device. The control unit 1700 can control to register the identification information of the sensor device and to operate under the control of the system controller. The control unit 1700 can control to pair with at least one gateway and to communicate with the at least one gateway paired. The control unit 1700 can enter the pairing mode according to the user. Herein, the user can include a manager or an installer of the sensor device. For example, when detecting the event for the pairing mode entry from the user, the control unit 1700 can control to enter the pairing mode. Herein, the event for the pairing mode entry can include pressing a physical button or selecting a software menu item. According to an embodiment, the control unit 1700 can transmit the identification information. For example, the sensor device 201 can transmit the identification to the terminal using the short-range communication (e.g., NFC). The control unit 1700 can obtain its ID in the pairing with the gateway and register the obtained ID as its ID.

The communication unit 1710 can include various communication circuitry and can communicate with at least one of the system controller, the terminal, and the gateway. For example, the communication unit 1710 can communicate with at least one of the system controller, the terminal, and the gateway through the wireless communication or the wired communication. The wireless communication can include at least one of, for example, WiFi, BT, NFC, RFID, GPS, Zigbee, IR, Z-wave, and cellular communication (e.g., LTE, LTE-A, CDMA, WCDMA, UMTS, WiBro, or GSM). The wired communication module can include, for example, at least one of USB, HDMI, RS-232, and POTS.

The storage unit 1720 stores information and a program required for the operations of the sensor device. According to an example embodiment, the storage unit 1720 can store the identification information of the sensor device, and the configuration information. The storage unit 1720 can store the information of the paired gateway.

Figure 18:
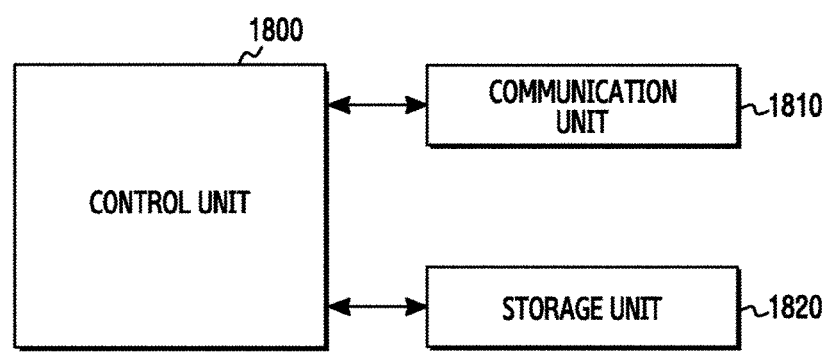
FIG. 18 is a block diagram illustrating an example System Air Conditioner (SAC) in a wireless communication system according to various embodiments of the present disclosure.

FIG. 18 is a block diagram illustrating an example SAC in a wireless communication system according to various example embodiments of the present disclosure. Hereafter, a term such as 'part' or '~er' indicate a unit for processing at least one function or operation, and can be implemented using hardware, software, or a combination of hardware and software.

Referring to FIG. 18, the SAC can include a control unit (e.g., including processing circuitry) 1800, a communication unit (e.g., including communication circuitry) 1810, and a storage unit 1820.

The control unit 1800 can include various processing circuitry, such as, for example, and without limitation, at least one processor. The control unit 1800 controls and processes the operations of the SAC. The control unit 1800 can perform control to register the identification information of the SAC and to operate under the control of the system controller. According to an example embodiment, the control unit 1800 can obtain its identification information from the terminal and register the obtained identification information. The control unit 1800 can send the message indicating the identification information registration complete to the system controller or the terminal.

The communication unit 1810 can include various communication circuitry and can communicate with at least one of the system controller and the terminal. For example, the communication unit 1810 can communicate with at least one of the system controller and the terminal through the wireless communication or the wired communication. The wireless communication can include at least one of, for example, WiFi, BT, NFC, RFID, GPS, Zigbee, IR, Z-wave, and cellular communication (e.g., LTE, LTE-A, CDMA, WCDMA, UMTS, WiBro, or GSM). The wired communication module can include, for example, at least one of USB, HDMI, RS-232, and POTS.

The storage unit 1820 stores information and a program required for the operations of the SAC. According to an example embodiment, the storage unit 1820 can store the identification information of the SAC, and the configuration information.

As set forth above, as the system controller selects the gateway to pair with the device based on the location information of the terminal and controls the selected gateway to conduct the pairing in the wireless communication system, user convenience can be enhanced because the user (or a manager) does not have to select the pairing button of the gateway in person. In addition, the system controller obtains the device identification information from the terminal, requests the gateway to pair with the device corresponding to the identification information, and thus enhance the security. Further, the gateway can obtain the device additional information from the terminal and efficiently control each device based on the obtained additional information.

The methods described in the claims or the description of the present disclosure can be implemented in software, firmware, hardware, or in their combinations.

The software can be stored in a computer-readable storage medium. The computer-readable storage medium stores at least one program (software module), when executed by at least one processor in an electronic device, including instructions making the electronic device to execute the method the present disclosure.

Such software can be stored in volatile or non-volatile storage devices such as a Read Only Memory (ROM), memories such as a Random Access Memory (RAM), a memory chip, a device, or an integrated circuit, or optical or magnetic readable media such as a Compact Disc (CD)-ROM, a Digital Versatile Disc (DVD), a magnetic disk, or a magnetic tape.

A storage device and a storage medium are an example of machine-readable storage media which are suitable for storing a program including instructions to implement the embodiments, or programs. Therefore, the present disclosure provides a program including codes to implement an apparatus or a method according to any one of the claims of the present disclosure, and a machine-readable storage medium including the program. Further, such programs can be transferred electronically through a medium such as a communication signal transferred through a wired or wireless connection, and may appropriately include an equivalent medium.

In the various example embodiments of the present disclosure, the elements included in the disclosure are expressed in a singular or plural form. However, the singular or plural expression is appropriately selected according to a proposed situation for the convenience of explanation and the present disclosure is not limited to a single element or a plurality of elements. The elements expressed in the plural form may be configured as a single element and the elements expressed in the singular form may be configured as a plurality of elements.

While the disclosure has been illustrated and described with reference to certain example embodiments thereof, it will be understood by those skilled in the art that various changes in form and details may be made therein without departing from the spirit and scope of the disclosure as defined by the appended claims and their equivalents.

What is claimed is:

1. A method of operating a system controller, comprising:
 receiving location information of a first electronic device from the first electronic device;
 determining a second electronic device to be paired with a third electronic device located near the first electronic device based on the location information of the first electronic device; and
 sending a signal requesting the determined second electronic device to operate in a pairing mode for initiating a pairing between the second electronic device and the third electronic device.

2. The method of claim 1, further comprising:
 receiving identification information of the third electronic device from the first electronic device; and
 sending the identification information of the third electronic device to the second electronic device to enable the second electronic device to identify the third electronic device,
 wherein the identification information comprises at least one of: a personal identification number (PIN), a medium access control (MAC) address, a quick response (QR) code, and a serial number.

3. The method of claim 1, wherein determining the second electronic device to be paired with the third electronic device located near the first electronic device based on the location information of the first electronic device comprises:
 determining the second electronic device closest to a location of the first electronic device among a plurality of second electronic devices based on location information of the first electronic device.

4. The method of claim 1, further comprising:
 receiving a pairing complete report message comprising identification information of the paired third electronic device, from the second electronic device;
 identifying the third electronic device closest to the location of the first electronic device among a plurality of third electronic devices corresponding to different location information;
 registering the identification information received from the second electronic device as identification information of the identified third electronic device; and
 sending a registration message comprising the identification information of the third electronic device and the location information of the third electronic device, to the first electronic device.

5. The method of claim 4, wherein the registration message further comprises information of the second electronic device paired with the third electronic device.

6. The method of claim 4, further comprising:
 receiving height information of the first electronic device from the first electronic device;
 identifying the third electronic device closest to the location of the first electronic device among a plurality of third electronic devices corresponding to different location information; and identifying one of the third electronic devices corresponding to the different location information, based on the location information and the height information of the first electronic device.

7. A system controller comprising:
at least one transceiver comprising communication circuitry; and
a processor,
wherein the processor is configured to receive location information of a first electronic device from the first electronic device, to determine a second electronic device to be paired with a third electronic device located near the first electronic device based on the location information of the first electronic device, and to send a signal to the determined second electronic device requesting the determined second electronic device to operate in a pairing mode for initiating a pairing between the second electronic device and the third electronic device.

8. The system controller of claim 7, wherein the processor is configured to receive identification information of the third electronic device from the first electronic device, and to send the identification information of the third electronic device to the second electronic device to enable the second electronic device to identify the third electronic device, and
the identification information comprises at least one of: a personal identification number (PIN), a medium access control (MAC) address, a quick response (QR) code, and a serial number.

9. The system controller of claim 7, wherein the processor is configured to determine the second electronic closest to a location of the first electronic device among a plurality of second electronic devices based on location information of the first electronic device.

10. The system controller of claim 7, wherein the processor is configured to receive a pairing complete report message comprising identification information of the paired third electronic device from the second electronic device, to identify a third electronic device closest to the location of the first electronic device among a plurality of third electronic devices corresponding to different location information, to register the identification information received from the second electronic device as identification information of the identified third electronic device, and to send a registration message comprising the identification information of the third electronic device and the location information of the third electronic device, to the first electronic device.

11. The system controller of claim 10, wherein the registration message further comprises information of the second electronic device paired with the third electronic device.

12. The system controller of claim 10, wherein the processor is configured to receive height information of the first electronic device from the first electronic device, and to identify the third electronic device closest to the location of the first electronic device among a plurality of third electronic devices corresponding to different location information based on the location information and the height information of the first electronic device.

13. A first electronic device comprising:
at least one transceiver comprising communication circuitry; and a processor,
wherein the processor is configured to obtain location information of the first electronic device, to send the location information of the first electronic device to a system controller to operate a second electronic device to be paired with a third electronic device located near the first electronic device, in a pairing mode for initiating a pairing between the second electronic device and the third electronic device.

14. The first electronic device of claim 13, wherein the processor is configured to obtain identification information of the third electronic device and to send the obtained identification information to the system controller to enable the second electronic device to identify the third electronic device, and
the identification information comprises at least one of: a personal identification number (PIN), a medium access control (MAC) address, a quick response (QR) code, and a serial number.

15. The first electronic device of claim 13, wherein the processor is configured to obtain height information of the first electronic device, and to send the height information of the first electronic device to the system controller to enable the second electronic device and/or the system controller to identify the third electronic device.

16. The first electronic device of claim 13, further comprising:
a display,
wherein the processor is configured to receive a message comprising identification information and location information of the third electronic device from the system controller, to map and store the received identification information to the third electronic device corresponding to the received location information among a plurality of third electronic devices corresponding to different location information, and to display the identification information of the third electronic device and pairing complete of the third electronic device on a drawing showing installation locations of the third electronic devices.

17. The first electronic device of claim 16, wherein the message further comprises information of the second electronic device paired with the third electronic device, and
the processor is configured to display the second electronic device paired with the second electronic device on the drawing based on the information of the second electronic device.

18. The first electronic device of claim 13, wherein the processor is further configured to send the location information of the first electronic device to the system controller, to receive a first signal comprising identification information of the second electronic device corresponding to the location information from the system controller, and to send a second signal comprising the identification information of the second electronic device to the second electronic device.

19. The first electronic device of claim 18, wherein the processor is configured to determine whether a signal indicating that identification information of the second electronic device is registered, is received from one of the second electronic device and the system controller, and to periodically send the identification information to the second electronic device until the signal indicating the identification information registration is received.

20. The first electronic device of claim 18, wherein the first signal and the second signal further comprise configuration information of the second electronic device.

* * * * *